United States Patent
Kajikawa et al.

[11] Patent Number: 6,133,193
[45] Date of Patent: Oct. 17, 2000

[54] ABSORBENT RESIN COMPOSITION AND METHOD FOR PRODUCTION THEREOF

[75] Inventors: Katsuhiro Kajikawa; Takumi Hatsuda; Masatoshi Nakamura, all of Hyogo, Japan

[73] Assignee: Nippon Shokubai Co., Ltd., Osaka-fu, Japan

[21] Appl. No.: 08/836,088

[22] PCT Filed: Oct. 26, 1995

[86] PCT No.: PCT/JP95/02194

§ 371 Date: Jul. 23, 1997

§ 102(e) Date: Jul. 23, 1997

[87] PCT Pub. No.: WO96/13542

PCT Pub. Date: May 9, 1996

[30] Foreign Application Priority Data

Oct. 26, 1994 [JP] Japan ................................. 6-262926
Dec. 22, 1994 [JP] Japan ................................. 6-320501

[51] Int. Cl.$^7$ .................................................. B01J 20/26
[52] U.S. Cl. .................... 502/402; 526/240; 526/317.1; 526/318.1; 528/274; 528/486; 428/402
[58] Field of Search .................... 528/272, 274, 528/486; 502/402; 526/240, 317.1, 318.1; 428/402

[56] References Cited

U.S. PATENT DOCUMENTS

| 4,394,930 | 7/1983 | Korpman | 220/444 |
|---|---|---|---|
| 4,734,478 | 3/1988 | Tsubakimoto et al. | 527/300 |
| 5,002,986 | 3/1991 | Fujiura et al. | 524/47 |
| 5,164,459 | 11/1992 | Kimura et al. | 525/384 |
| 5,244,735 | 9/1993 | Kimura et al. | 428/402 |
| 5,248,709 | 9/1993 | Brehm et al. | 523/221 |
| 5,250,640 | 10/1993 | Irie et al. | 526/88 |
| 5,275,773 | 1/1994 | Irie et al. | 264/141 |
| 5,300,565 | 4/1994 | Berg et al. | 525/54.2 |
| 5,478,879 | 12/1995 | Kajikawa et al. | 524/500 |

FOREIGN PATENT DOCUMENTS

| 0 450 922 A2 | 10/1991 | European Pat. Off. . |
|---|---|---|
| 0 450 923 A2 | 10/1991 | European Pat. Off. . |
| 0 574 248 A2 | 12/1993 | European Pat. Off. . |
| 1-266139 | 10/1989 | Japan . |
| 2-57305 | 2/1990 | Japan . |
| 2-196802 | 8/1990 | Japan . |
| 1-5-43610 | 7/1991 | Japan . |
| 5-70597 | 7/1992 | Japan . |
| 6-41319 | 2/1994 | Japan . |

*Primary Examiner*—David W. Wu
*Assistant Examiner*—R. Harlan
*Attorney, Agent, or Firm*—Fish & Richardson P.C.

[57] ABSTRACT

An absorbent resin composition which shows high speed of absorption, excels in fluid permeability, and enjoys a high absorption capacity under load comprises primary particles of an absorbent resin and granulated particles of an absorbent resin having an average particle size smaller than the average particle size of the primary particles. An absorbent article contains the composition. The absorbent resin composition is produced by a method which comprises a step of producing granulated particles by granulating particles of absorbent resin having an average particle size in the range of 10 to 100 μm and a step of mixing the resultant granulated particles of the absorbent resin with the primary particles of an absorbent resin having an average particle size in the range of 150 to 800 μm. The granulated particles of an absorbent resin is produced by a method which comprises mixing the particles of absorbent resin with a granulating agent and extruding the resultant mixture through an extrusion granulating device provided with a spherical perforated plate.

24 Claims, 1 Drawing Sheet

ABSORBENT RESIN COMPOSITION AND METHOD FOR PRODUCTION THEREOF

TECHNICAL FIELD

This invention relates to a novel absorbent resin composition and a method for the production thereof. More particularly, it relates to an absorbent resin composition which features high speed of absorption, excels in fluid permeability, and high absorption capacity under load and a method for economically advantageous production of the absorbent resin composition.

BACKGROUND ART

In recent years, absorbent resins which are capable of absorbing some tens to some hundreds times their own weights of water have been developed. Various absorbent resins of this class have been finding utility in applications requiring absorption and retention of water such as in the field of hygienic materials including sanitary goods and disposable diapers, the field of agriculture and horticulture, the field of foodstuffs requiring retention of freshness, and the field of industrial products requiring protection against dew formation and retention of refrigeration.

The absorbent resins of this class known to the art include the hydrolyzate of a starch-acrylonitrile graft polymer (JP-B-49-43,395), the neutralized starch-acrylic acid graft polymer (JP-A-51-125,468), the saponified vinyl acetate-acrylic ester copolymer (JP-A-52-14,689), the hydrolyzate of an acrylonitrile copolymer or acrylamide copolymer (JP-B-53-15,959), the cross-linked derivatives thereof, the self-crosslinking sodium polyacrylate obtained by reversed-phase suspension polymerization (JP-A-53-46,389), and the partially neutralized cross-linked polyacrylic acid (JP-A-55-84,304), for example.

The behaviors that the absorbent resins are required to possess vary depending on the kinds of use to be found for the absorbent resins. As the properties required of the absorbent resins which are intended for hygienic materials, high absorption capacity under load, high speed of absorption, and excels in fluid permeability to be manifested on contact with an aqueous liquid may be cited. These properties do not necessarily show positive correlations. It has been difficult to have these properties simultaneously adapted for one another.

In an effort to heighten the speed of absorption of an absorbent resin, attempts are being made to enlarge the surface area of the resin by such means as, for example, decreasing the particle size of the resin, granulating the resin, or molding the resin in the form of scales. Generally, when an absorbent resin is molded in the form of particles of a small size, the absorbent resin particles on contact with an aqueous liquid form the so-called "wet clusters" and incur a decrease in the speed of absorption. When an absorbent resin is granulated, the granules on contact with an aqueous liquid individually succumb to the phenomenon of being converted into "wet clusters" and rather suffer a decrease in the speed of absorption. When an absorbent resin is molded in the form of thin flakes, though the thin flakes are improved in terms of the absorption speed, the improvement is not fully satisfactory because the thin flakes induce the phenomenon of gel blocking. Further, the formation of thin flakes of the absorbent resin is uneconomical because the produced thin flakes inevitably assume a large volume and incur a large cost for transportation and storage.

Techniques for exalting the absorption speed of an absorbent resin by cross-linking molecular chains in the surface region of the absorbent resin and heightening the cross-link density in the surface layer and thereby precluding the formation of wet clusters have been proposed. These techniques are disclosed in JP-A-57-44,627, JP-A- 58-42,602, JP-B-60-18,690, JP-A-58-180,233, JP-A-59-62,665, and JP-A-61-16,903, for example. The improvement of absorbent resins in absorption speed has been attained to a certain extent by these techniques. The particles of these absorbent resins in their existent state contain particles of smaller size than the optimum size in a fairly high extent. When such a technique for improvement is used on an absorbent resin of such particle size distribution as described above, however, the treated absorbent resin acquires no amply high absorption speed and suffers a decrease in fluid permeability due to gel blocking.

For the solution of these problems, the following methods have been proposed for the granulation of absorbent resin. As techniques for granulation, (a) a method which comprises molding a fine absorbent resin powder with water or a binder combining water with a water-soluble polymer or inorganic powder (JP-A-61-97,333 and JP-A-61-101,536), (b) a method which comprises dispersing a fine absorbent resin powder in a non-aqueous liquid, causing the resultant dispersion to absorb an aqueous monomer solution added thereto, and polymerizing the monomer in the resultant mixture (JP-A-62-230,813), and (c) a method which comprises preparing an organic solvent containing the hydrogel of absorbent resin by the reversed-phase suspension polymerization technique, adding a fine absorbent resin powder to the hydrogel solution, and then subjecting the resultant mixture to azeotropic dehydration (JP-A-63-210,108) and as techniques for reclamation of a fine powder, (d) a method which comprises swelling a fine absorbent resin powder with water of an amount sufficient for forming amorphous gel, pulverizing the resultant continuous amorphous gel, and drying the pulverized gel (U.S. Pat. No. 4,950,692), (e) a method which comprises adding an aqueous cross-linking agent solution to a fine absorbent resin powder thereby forming gellike lumps, causing the resin in the lumps to undergo cross-linkage, and pulverizing the lumps of cross-linked resin (EP-A-0,401,004), and (f) a method which comprises allowing sprayed water to contact a dried fine powder thereby inducing partial hydration of the powder, kneading the fine powder with the water at the same time that the water is sprayed, and then in a separate area of mixture, kneading a viscous material with the hydrated fine powder at medium shear such that a substantially uniformly blended product results (EP-A-0,417,761), for example, have been known in the art.

In the case of the method of (a) mentioned above, the produced granules have no ample strength and consequently, during the course of conveyance and transportation along production lines in a plant, sustain partial fracture and possibly induce regeneration of a fine powder. Further, the granules, after absorbing a liquid, sustain fracture and regenerate a fine powder and consequently fail to acquire sufficient fluid permeability. In the case of the method (b) mentioned above, the absorbent resin is not easily made to absorb the aqueous monomer solution uniformly throughout the entire volume thereof and, as a result, the absorbent resin produces its granules only at a low ratio. Further, since the aqueous monomer solution permeates the resin powder before it undergoes polymerization, the absorbent resin consequently incurs a decrease in the absorption capacity. In the case of the method (c) mentioned above, although the granules are obtained indeed as contemplated, they are deficient in physical integrity so that, after being swelled with absorbed water, they induce regeneration of minute gel particles. Thus, this method is problematic in giving a product which merely impairs fluid permeability and fluid diffusibility.

The methods of (d), (e), and (f) mentioned above prove not only complicated and difficult in terms of operation but also disadvantageous in terms of economy because they require the fine absorbent resin powder to assume a swelled state by addition of water or an aqueous cross-linking solution and subsequently to resume a dry state.

The dry particles which are formed solely of the absorbent resin powder obtained by the method (d) mentioned above are as deficient in fluid permeability and fluid diffusibilityas the product of the method (c) mentioned above because these dry particles, when swelled with an absorbed liquid, cause substantially all the used fine powder to regenerate minute gel particles. In the case of the method of (e) mentioned above, since the cross-linking agent permeates together with a large amount of water to the cores of the minute particles of absorbent resin and undergoes a cross-linking reaction, the produced dry particles are at a disadvantage in incurring a decrease in the absorption capacity.

As means for producing an absorbent resin which forms a fine absorbent resin powder improved in various properties, a method which comprises mixing a carboxyl group-containing absorbent resin powder with a polyhydric alcohol and allowing them to react until the absorption capacity reaches a level in a fixed range (JP-A-04-214, 735), a method which comprises carrying out the procedure of this method in a high-speed stirring type mixer lined with a specific material (JP-A-04-214,734), a method which comprises causing the blend produced by the high-speed stirring type mixer to be heated under application of a fixed magnitude of force (energy) (JP-A-04-214,736), and particulate, absorbent, polymeric compositions (-JP-A-05-506,263) have been disclosed, for example.

Though these methods are indeed capable of improving absorption capacity under load, speed of absorption, and fluid permeability, they necessarily encounter difficulty in giving a fixed size to the produced particles because they use a high-speed stirring type mixer. They are, therefore, incapable of producing particles of an arbitrary size.

For the purpose of improving the fastness of adhesion of an absorbent resin to a substrate of such material as nonwoven fabric or film or molding the absorbent resin in such a stably fixed shape as film or foam sheet, a method which comprises mixing an absorbent resin powder with a polyhydric alcohol such as glycerin or ethylene glycol (optionally in combination with a foaming agent) in the same manner as described above and applying the resultant mixture to a substrate thereby forming a sheetlike absorbent material (JP-A-57-73,051) has been also known to the art. The idea of using in this method a low-temperature extruding device or a low-temperature extruding device provided with a heating die for the purpose of the application mentioned above has been also disclosed. The low-temperature extruding device mentioned above, however, is used for the purpose of obtaining a foamed sheet without requiring use of a foaming agent by thoroughly kneading the absorbent resin powder with the poly-hydric alcohol and uniformly dispersing minute air bubbles arising from a gas separately introduced into the device and the low-temperature extruding device provided with the heating die is likewise used for the purpose of obtaining a foamed sheet by thoroughly kneading the absorbent resin powder with the liquid organic polyhydroxy compound and the foaming agent and causing the resultant mixture to foam in the part of heating die. They are not aimed at obtaining granules of an arbitrary size.

As a means for obtaining particles of an arbitrary size, a method which comprises combining an absorbent resin with a mineral powder, an absorption inhibitor selected from the group consisting of alcohols, ketones, esters, ethers, aldehydes, and inorganic neutral salts, and water and extrusion molding the resultant mixture (JP-A-01-266,139) has been disclosed. Though this method permits fairly good control of particle size in the range of relatively rough particle size, it experiences difficulty in obtaining particle size, 0.1 to 1.0 mm, which are generally appropriate for hygienic materials. Further, this method incurs adulteration of the produced absorbent resin with a large proportion of defiling substances and, therefore, is incapable of obtaining an absorbent resin which excels in various absorption properties including absorption capacity and speed of absorption.

An object of this invention, therefore, is to provide a novel absorbent resin composition and a method for the production thereof.

Another object of this invention is to provide an absorbent resin composition featuring a high speed of absorption, excellent fluid permeability, and a high absorption capacity under load and a method for economically advantageous production thereof.

Still another object of this invention is to provide granules of absorbent resin permitting the arbitrary control of particle size that has never been attained by any of the conventional method, possessing high physical integrity, and excelling in ease of handling and various absorption properties including fluid permeability and speed of absorption and a method for economically advantageous production thereof.

A further object of this invention is to provide granules of absorbent resin which are relatively uniform in shape and size, capable of retaining shape while absorbing a liquid, and free from regeneration of fine particles.

DISCLOSURE OF THE INVENTION

The objects mentioned above are accomplished by the following aspects (1) through (26) of the present invention.

(1) An absorbent resin composition comprising primary particles of absorbent resin and granulated particles of absorbent resin, said granulated particles having been obtained by granulating particles of absorbent resin having an average particle size smaller than that of said primary particles.

(2) An absorbent resin composition according to the aspect (1) mentioned above, wherein said primary particles of absorbent resin have an average particle size in the range of 150 to 800 $\mu$m and said granulated particles of absorbent resin are obtained by granulating particles of absorbent resin having an average particle size in the range of 10 to 100 $\mu$mm.

(3) An absorbent resin composition according to the aspect (1) or aspect (2) mentioned above, wherein said primary particles of absorbent resin have an average particle size 2.5 to 10 times that of particles of absorbent resin from which said granulated particles of absorbent resin are obtained by granulation.

(4) An absorbent resin composition according to any of the aspects (1) to (3) mentioned above, wherein said granulated particles of absorbent resin have an average particle size in the range of 150 to 800 $\mu$m.

(5) An absorbent resin composition according to any of the aspects (1) to (4) mentioned above, wherein said granulated particles of absorbent resin have an average particle size larger than that of said primary particles of absorbent resin.

(6) An absorbent resin composition according to any of the aspects (1) to (5) mentioned above, wherein said granulated particles of absorbent resin have an average particle size 1.1 to 5 times that of said primary particles of absorbent resin.

(7) An absorbent resin composition according to any of the aspects (1) to (6) mentioned above, wherein the amount of said granulated particles of absorbent resin is in the range of 5 to 100 parts by weight based on 100 parts by weight of said primary particles of absorbent resin.

(8) An absorbent resin composition according to any of the aspects (1) to (7) mentioned above, wherein said granulated particles of absorbent resin have an apparent gel expansion ratio of at least 10%.

(9) An absorbent resin composition according to any of the aspects (1) to (8) mentioned above, wherein said granulated particles of absorbent resin are obtained by granulating particles of absorbent resin with a polycationic compound and/or a polyhydric alcohol.

(10) An absorbent resin composition according to the aspect (1) mentioned above, wherein said granulated particles of absorbent resin have an aspect ratio (major size/minor size) of not less than 1.5.

(11) An absorbent resin composition according to the aspect (1) mentioned above, wherein said granulated particles of absorbent resin are obtained by mixing particles of absorbent resin with a granulating agent and extruding the resultant mixture through an extrusion granulating device provided with a spherical perforated plate.

(12) Granulated particles of absorbent resin having an aspect ratio (major size/minor size) of not less than 1.5.

(13) Granulated particles of the absorbent resin according to the aspect (12) mentioned above, wherein said minor size is in the range of 0.3 to 1.5 mm.

(14) Granulated particles of the absorbent resin according to the aspect of (13) mentioned above, wherein the speed of absorption of said granulated particles measured by the interval between the time 2.00 g of said granulated particles are thrown into 50 ml of physiological saline solution while the solution is kept stirred and the time the stirrer exposed at the central part of the solution is hidden by a swelled gel is not more than 40 seconds.

(15) A method for the production of granulated particles of absorbent resin, characterized by mixing particles of absorbent resin with a granulating agent and extruding the resultant mixture through an extrusion granulating device provided with a spherical perforated plate.

(16) A method according to the aspect (15) mentioned above, wherein said particles of absorbent resin have a particle size distribution containing no particle larger than 1000 μm and containing particles 1 to 150 μm in size at a ratio in the range of 40 to 100%.

(17) A method according to the aspect (15) or aspect (16) mentioned above, wherein said granulating agent is capable of forming a chemical bond with the functional group possessed by said particles of absorbent resin.

(18) A method according to any of the aspects (15) to (17) mentioned above, wherein said granulating agent is capable of forming a covalent bond with the functional group possessed by said particles of absorbent resin.

(19) A method according to any of the aspects (15) to (18) mentioned above, wherein said granulating agent is at least one member selected from the group consisting of polyhydric alcohols, amino group-containing compounds, amide group-containing compounds, and carboxyl group-containing compounds and is soluble in water.

(20) A method according to any of the aspects (15) to (19) mentioned above, wherein said granulating agent is a polyhydric alcohol.

(21) A method according to any of the aspects (15) to (20) mentioned above, wherein the holes in the perforated plate of the extruding granulating device provided with a spherical perforated plate have size in the range of 0.3 to 1.5 mm.

(22) An absorbent article containing the absorbent resin composition according to any of the aspects (1) to (11) mentioned above.

(23) An absorbent article according to the aspect (22) mentioned above, wherein said absorbent resin composition is contained in said absorbent article at a ratio in the range of 20 to 80% by weight based on the total weight of said absorbent article.

(24) A method for the production of an absorbent resin composition comprising a step of producing granulated particles of absorbent resin by granulating particles of absorbent resin having an average particle size in the range of 10 to 100 μm and a step of mixing the resultant granulated particles of absorbent resin with primary particles of an absorbent resin having an average particle size in the range of 150 to 800 μm.

(25) A method according to the aspect (24) mentioned above, wherein said granulated particles of absorbent resin have an average particle size in the range of 150 to 800 μm.

(26) A method according to the aspect (24) or aspect (25) mentioned above, wherein said particles of absorbent resin has the surface region thereof cross-linked.

BEST MODE FOR CARRYING OUT THE INVENTION

Now, this invention will be described in detail below with reference to preferred embodiments.

The absorbent resin which can be used in this invention, when placed in water, absorbs a large amount of water and swells with the absorbed water and assumes the state of hydrogel. It is found in the absorbent resins well known to date. As typical examples of the absorbent resin effectively usable herein, the hydrolyzate of a starch-acrylonitrile graft copolymer, the partially neutralized starch-acrylonitrile graft copolymer, the saponified vinyl acetate-acrylic ester copolymer, the hydrolyzate of an acrylonitrile copolymer or acrylamide copolymer, the cross-linked derivatives of such copolymers as mentioned above, the partially neutralized polyacrylic acid, and the cross-linked neutralized derivatives of polyacrylic acid may be cited. Among other examples cited above, the cross-linked neutralized derivatives of polyacrylic acid prove particularly advantageous in consideration of such factors as the effect of this invention and the ease in procurement. This invention does not particularly discriminate the absorbent resin to be used herein on account of form. It may be in the form of gel which is assumed after polymerization and before drying, the form of powder which is assumed after drying, or the form having the surface part and the neighborhood thereof subjected to a cross-linking treatment, whichever will suit best the occasion. The form of powder which is assumed by drying and pulverizing and the form having the surface part and the neighborhood thereof already cross-linked prove preferable.

Generally, the absorbent resin is obtained by polymerizing a water-soluble unsaturated monomer. As typical examples of the water-soluble unsaturated monomer, anionic monomers and salts thereof such as (meth)acrylic acids, (anhydrous) maleic acids, fumaric acid, crotonic acid, itaconic acid, 2-(meth)acryloyl ethane sulfonic acids, 2-(meth)acryloyl propane sulfonic acids, 2-(meth)acrylamide-2-methyl propane sulfonic acids, vinyl sulfonic acid, and styrene sulfonic acid; nonionic hydrophilic group-containing monomers such as (meth)acryl amides, N-substituted (meth)acryl amides, 2-hydroxyethyl (meth)acrylates, 2-hydroxypropyl (meth)acrylates, methoxy polyethylene glycol (meth)acrylates, and polyethylene glycol (meth)acrylates; and amino group-containing unsaturated monomers and quaternized products thereof such as N,N-dimethylaminoethyl (meth)acrylates, N,N-dimethylaminopropyl (meth)acrylates, and N,N-dimethylamino-propyl (meth)acrylamides maybe cited. In the polymerization, a hydrophobic monomer selected from the group consisting of acrylic esters such as methyl (meth)-acrylates, ethyl (meth)-acrylates, and butyl (meth) acrylates, vinyl acetate, and vinyl propionate may be additionally used in an amount not so large as to inhibit extremely the hydrophilicity of the produced polymer. One or more members selected from the group of hydrophobic monomers enumerated above may be used. In due consideration of the various absorption properties of the ultimately obtained absorbent material, it is advantageous to use at least one member selected from the group consisting of (meth)acrylic acids (and salts thereof), 2-(meth)acryloyl ethane sulfonic acids (and salts thereof), 2-(meth)-acrylamide-2-methyl propane sulfonic acids (and salts thereof), (meth)acrylamides, methoxy polyethylene glycol (meth)acrylates, N,N-dimethylaminoethyl (meth)acrylates, and quaternized derivatives thereof. It is preferable to use such a hydrophobic monomer as has a (meth) acrylic acid (or a salt thereof) as an essential component. Most preferably, the (meth) acrylic acid has 30 to 90 mol % thereof neutralized with a basic substance. The absorbent resin advantageously has an absorption capacity as expressed by the numerical value to be found by the tea bag test in physiological saline solution in the approximate range of 20 to 60 g/g. The proportion of the non-crosslinked component, or the so-called Extractable, of the absorbent resin is properly not more than 20% by weight, preferably not more than 10% by weight. The smaller this proportion is, the more appropriate will the results be.

The absorbent resin to be used in this invention is of a self-crosslinking type which is produced without requiring use of a cross-linking agent. It may be obtained, when necessary, by using a cross-linking agent possessing a polymerizing unsaturated group and/or a reacting functional group in an amount such that the various properties of the ultimately obtained absorbent resin may reach prescribed standards.

As typical examples of the cross-linking agent which is effectively used herein, N,N'-methylene bis(meth)acrylamides, (poly) ethylene glycol (meth) acrylates, glycerin tri (meth)-acrylates, trimethylol propane tri(meth)acrylates, triallyl-amines, triallyl cyanurate, triallyl isocyanurate, glycidyl (meth)acrylates, (poly)ethylene glycols, diethylene glycol, (poly)glycerol, propylene glycol, diethanol amine, trimethylol propane, pentaerythritol, (poly) ethylene glycol diglycidyl ethers, (poly)glycerol polyglycidyl ethers, epichlorohydrin, ethylene diamine, polyethylene imine, (poly)aluminum chlorides, aluminumisulfate, calciumchloride, andmagnesium sulfate may be cited. These cross-linking agents may be used either alone or in the form of two or more members, with consideration to the reactivity thereof.

In the production of the absorbent resin, the monomer component mentioned above may be polymerized in the presence of a hydrophilic polymer such as, for example, starch, cellulose, or polyvinyl alcohol so that the polymerization may proceed simultaneously with the formation of a graft linkage or complex.

The polymerization of the monomer component is initiated appropriately by using a water-soluble radical polymerization initiator such as, for example, sodium persulfate ammonium persulfate, potassium persulfate, hydrogen peroxide, t-butyl hydroperoxide, or 2,2'-azobis-amidinopropane dihydrochloride. This invention does not discriminate this polymerization on account of the kind of polymerization. The polymerization is advantageously carried out by such methods as bulk polymerization, solution polymerization, and reversed-phase suspension polymerization, for example.

The absorbent resins enumerated above are used either singly or in the form of a mixture of two or more members.

This invention does not particularly discriminate the absorbent resin to be used therein on account of the shape thereof. The absorbent resin may be in the form of flakes which are obtained by drying in a drum or in an amorphous form which is obtained by pulverizing lumps of resin. It may be otherwise in the form of spheres which are obtained by reversed-phase suspension polymerization.

The primary particles of absorbent resin to be used in this invention are such single particles as escape being fractured under moderate force. They are not fractured by the impact from the operation of classification or the operation of conveyance, for example.

The primary particles of the absorbent resin to be used in this invention may be in the form of such particles as permit accomplishment of the objects of this invention. They are not particularly discriminated on account of the size thereof. In consideration of the various absorption properties of the produced absorbent resin composition, the primary particles appropriately have an average particle size in the range of 150 to 800 $\mu$m, preferably 200 to 400 $\mu$m. More advantageously, they substantially exclude particles more than 1000 $\mu$m in size. If the average particles size of the primary particles is less than 150 $\mu$m, the produced absorbent resin composition will tend to be deficient in fluid permeability. If this average particles size exceeds 800 $\mu$m, the composition will tend to incur a decrease in the speed of absorption. Further, if the primary particles have an unduly large particle size, the produced absorbent resin composition, when used as an absorbent in a hygienic material, will have the possibility of inflicting a feeling of physical extraneity on users of the hygienic material.

The granulated particles of absorbent resin to be used in this invention are obtained by granulating particles of absorbent resin having an average particle size smaller than the average particle size of the primary particles mentioned above. Advantageously, the average particle size of said particles of absorbent resin is in the range of 10 to 100 $\mu$m.

Said particles of absorbent resin preferably contain particles of average particle size of 1 to 150 μm at a proportion in the range of 40 to 100%. If the average particle size of said particles of absorbent resin is less than 10 μm, the produced absorbent resin will tend to be deficient in fluid permeability. If this average particle size exceeds 100 μm, the produced absorbent resin will have the possibility of incurring a decrease in the speed of absorption and allowing no smooth progress of granulation. If the particles of absorbent resin have an average particle size larger than the particle size mentioned above, it will fail to produce an absorbent resin composition having a high speed of absorption and excelling in fluid permeability.

Appropriately, the primary particles of the absorbent resin of this invention have an average particle size 2.5 to 10 times, preferably 3 to 7 times, the average particle size of the particles of absorbent resin from which the granulated particles are to be produced by granulation.

If the average particle size of the primary particles of absorbent resin unduly deviates from the range mentioned above, there will arise the possibility of the primary particles incurring difficulty in simultaneously satisfying high speed of absorption and high fluid permeability.

The fact that the average particle size of the particles of absorbent resin yet to be granulated into the granulated particles is smaller than the average particle size of the primary particles of the absorbent resin can be easily confirmed by comparing the granulated particles of the same particle size with the primary particles.

The granulated particles of absorbent resin to be used in this invention may be such granules as permit accomplishment of the objects of this invention. They are not particularly discriminated on account of the size thereof. In consideration of the various absorption properties of the produced absorbent resin composition, the granulated particles appropriately have an average particle size in the range of 150 to 800 μm, preferably 450 to 700 μm. More advantageously, they substantially exclude particles more than 1000 μm in size. If the average particle size of the granulated particles is less than 150 μm, the produced absorbent resin composition will tend to be deficient in fluid permeability. If this average size exceeds 800 μm, the composition will tend to incur a decrease in the speed of absorption. Further, if the granulated particles have an unduly large particle size, the produced absorbent resin composition, when used as an absorbent in a hygienic material, will have the possibility of inflicting a feeling of physical extraneity on users of the hygienic material.

Advantageously, the absorbent resin composition of this invention contains granulated particles of absorbent resin larger than the primary particles of absorbent resin. In other words, it is proper that the granulated particles of absorbent resin should possess a larger average particle size than the primary particles of absorbent resin. Appropriately, the average particle size of the granulated particles of absorbent resin is 1.1 to 1.5 times, preferably 1.5 to 4 times, the average particle size of the primary particles of absorbent resin. The absorbent resin composition simultaneously satisfies excels in fluid permeability and high speed of absorption when it is made to contain the primary particles of absorbent resin so small as avoid impairing fluid permeability and the granulated particles of absorbent resin so large as avoid degrading fluid permeability.

The particles of absorbent resin to be used for the granulated particles of absorbent resin mentioned above may be what are obtained by classifying the portion of unduly minute particles of absorbent resin which occur during the formation of the primary particles of absorbent resin. It may be otherwise what are obtained by adopting a monomer different from the monomer used for the primary particles of absorbent resin, polymerizing the monomer, drying the resultant polymer, and pulverizing the dried polymer.

The particles of absorbent resin for use in this invention appropriately have the surface region thereof cross-linked secondarily by any of the methods well known in the art to date. By adopting particles of absorbent resin which are produced by mixing particles of absorbent resin with a cross-linking agent containing a group capable of reacting with at least two functional groups contained in the absorbent resin, allowing them to react, and subjecting the product of reaction to such a treatment as heightens the cross-link density in the surface region of the particles of absorbent resin, an absorbent resin composition which particularly excels in absorption speed can be obtained. The particles of absorbent resin the surface of which has been given a cross-linking treatment can be obtained by performing various surface treatments which are disclosed in a method which uses a polyhydric alcohol as a cross-linking agent (JP-A-58-180,233 and JP-A-61-16,903), a method which uses a polyglycidyl compound, a polyaziridine compound, a polyamine compound, or a polyisocyanate compound (JP-A-59-189,103), a method which uses glyoxal (JP-A-52-117, 393), a method which uses a polyvalent metal (JP-A-51-136,588, JP-A-61-257,235, and JP-A-62-7,745), a method which uses a silane coupling agent (JP-A-61-211,305, JP-A-61-252,212, and JP-A-61-264, 006), a method which uses an epoxy compound and a hydroxy compound (JP-A-02-132, 103), and a method which uses an alkylene carbonate (DE-4020780), for example. A method which relies on the presence of an inert inorganic powder (JP-A-60-163,956 and JP-A-60-255,814), a dihydric alcohol (JP-01-292,004), and water and an ether compound (JP-A-02-153, 903) respectively to promote the cross-linking reaction have been also known to the art.

The absorbent resin for use in this invention may have such auxiliaries as fine water-insoluble powder, surfactant, and short fibers incorporated additionally therein in such amounts as avoid inhibiting granulation. The incorporation of these auxiliary components possibly functions to heighten the absorption speed of the absorbent resin composition of this invention. As typical examples of the surfactant, polyoxyethylene alkyl ethers, polyoxyethylene alkylphenol ethers, sorbitan fatty esters, polyoxyethylene sorbitan fatty esters, polyoxyethylene acyl esters, oxyethylene oxypropylene block copolymers, and sucrose fatty esters may be cited.

As typical examples of the fine water-insoluble inorganic powder, mica, pyrophyllite, kaolinite, hulsite, other similar clayish minerals, and such finely divided silica products as Aerosil (produced by Nippon Aerosil Co., Ltd.) and Carplex (produced by Shionogi & Co., Ltd.) which are formed of silicon dioxide particles having an average particle size mainly below 50 u m maybe cited. Carbonblack, activated carbon, and pulp powder may be cited as concrete examples of the fine water-insoluble organic powder. The total amount of these auxiliary components to be used is in the range of 0.1 to 10 parts by weight, preferably 0.5 to 5 parts by weight, and most preferably 0.5 to 2 parts by weight, based on 100 parts by weight of the absorbent resin. If the total amount exceeds 10 parts by weight, the excess will produce no proportionate addition to the design effect but rather induce a decrease in the absorption capacity and occasionally render difficult the formation of granulated particles. If this amount is less than 0.1 part by weight, the effect which is aimed at by the use of the auxiliary components will not be obtained.

The granulated particles for use in this invention have no particular restriction with the exception that they are produced by granulating particles of absorbent resin. Advantageously they have an apparent gel expansion ratio of not less than 10%.

The term "apparent gel expansion ratio" as used herein refers to the numerical value indicating the apparent volume of a swelled gel which is formed when given granulated particles in a prescribed amount are left standing for about 10 minutes in about 10 times their volume of deionized water. This numerical value is thought of as proportional to the volume of voids in the swelled gel. It increases in proportion as the ratio of the granulated particles which swell without forming wet lumps increases and the total volume which is occupied in the swelled gel by voids necessary for the sake of fluid permeability increases.

If this apparent gel expansion ratio is less than 10%, the granulated particles will incur degradation of the fluid permeability or the speed of absorption.

The granulated particles of absorbent resin for use in this invention may be those obtained by granulating particles of absorbent resin in accordance with a method well known in the art to date (as disclosed, for example, in JP-A-61-97,333 and JP-A-61-101,536). For the purpose of accomplishing the objects of this invention, the granulated particles are advantageously produced by the granulation that is aided by the use of a specific granulating agent. Polycationic compounds and/or polyhydric alcohols are preferred examples of the granulating agent. Polyethylene imine, polyethylene imine modified by the cross-linkage with epihalohydrin to an extent of acquiring water solubility, polyamine, polyamide amine modified by having ethylene imine grafted thereto, protonatedpolyamide amine, polyether amine, polyvinyl amine, modified polyvinyl amine, polyalkyl amines, polyvinyl imidazole, polyvinyl pyridine, polyvinyl imidazoline, polyvinyl tetrahydropyridine, polydialkylamino alkylvinyl ether, poly-dialkylamino alkyl (meth)acrylates, polyallyl amine, polyamide polyamine epihalohydrin, and salts thereof may be cited as concrete examples of the polycationic compound. Among other polycationic compounds cited above, polyethylene imine, polyamide amine, polyether amine, polyvinyl amine, polyallyl amine, and polyamide polyamine epihalohydrin prove particularly advantageous from the viewpoint of the fluid permeability and the absorption capacity under load which are manifested by the produced absorbent resin composition. The molecular weight of such a polycationic compound appropriately is not less than 2,000, preferably not less than 5,000, and most preferably not less than 10,000. As typical examples of the polyhydric alcohol, ethylene glycol, diethylene glycol, triethylene glycol, polyethylene glycol, glycerin, diglycerin, polyglycerin, propylene glycol, diethanol amine, triethanol amine, polyoxy propylene, oxyethylene-oxypropylene block polymer, sorbitan fatty esters, polyoxyethylene sorbitan fatty esters, trimethylol propane, pentaerythritol, 1,3-propane diol, and sorbitol may be cited. Among other polyhydric alcohols cited above, ethylene glycol, diethylene glycol, triethylene glycol, polyethylene glycol, glycerin, diglycerin, and polyglycerin prove particularly advantageous from the viewpoint of the fluid permeability and the absorption capacity under load which are manifested by the produced absorbent resin composition. It is advantageous to use a polycationic compound and a polyhydric alcohol in combination.

Though the amount of the polycationic compound and/or the polyhydric alcohol to be used has no particular restriction, it is advantageously in the range of 0.01 to 30 parts by weight, preferably 0.1 to 10 parts by weight, based on 100 parts by weight of the absorbent resin. If the amount mentioned above is less than 0.01 part by weight, the granulated particles will possibly be deficient in physical integrity. Conversely this amount exceeds 30 parts by weight, the granulated particles will tend to incur a decrease in the absorption capacity.

The granulated particles of absorbent resin for use in this invention advantageously have an aspect ratio exceeding 1.5, preferably falling in the range of 2 to 100, and more preferably in the range of 5 to –50. The granulated particles having an aspect ratio exceeding 200 incur difficulty in attaining actual production thereof and those having an aspect ratio of not more than 1.5 occasionally fail to allow easy immobilization.

Advantageously, the absorbent resin composition of this invention is such that the proportion of the granulated particles of absorbent resin is in the range of 5 to 100 parts by weight, preferably 10 to 50 parts by weight, based on 100 parts by weight of the primary particles of absorbent resin. If the proportion of the granulated particles of absorbent resin is less than 5 parts by weight, the produced absorbent resin composition will occasionally fail to acquire an amply high speed of absorption. Conversely, if this proportion exceeds 100 parts by weight, the produced absorbent resin composition will occasionally fail to acquire amply high fluid permeability or absorption capacity under load.

This invention further provides an absorbent article which comprises the absorbent resin composition described above. An absorbent article which constitutes a perfect absorbent layer in a hygienic material, for example, can be obtained by combining the absorbent resin composition of this invention with cellulose fibers or a web thereof or synthetic fibers or a web thereof. Any of the well-known means for producing absorbent articles such as, for example, a method which comprises nipping an absorbent resin composition between opposed papers, non-woven fabrics, or mats made of cellulose fibers or synthetic fibers and a method which comprises blending cellulose fibers with an absorbent resin composition can be suitably selected for the production of the absorbent article. The absorbent article which is obtained as described above manifests great ability to absorb as compared with the conventional absorbent articles.

The absorbent article of this invention advantageously contains the absorbent resin composition at a ratio in the range of 20 to 80% by weight, based on the total weight of the absorbent article. The absorbent resin composition of this invention excels in such properties as the speed of absorption, the absorption capacity under load, and the fluid permeability, obviates the necessity for being incorporated at a relatively low concentration in a fibrous matrix, similarly to the conventional absorbent resin, for the purpose of precluding the adverse phenomenon of gel blocking, and attains effective incorporation at a relatively high concentration in the absorbent article. By using the absorbent resin composition at a high concentration, the absorbent article can be produced in a conspicuously thin as compared with the conventional absorbent articles. The proportion of the absorbent resin composition advantageously is in the range of 30 to 80% by weight, preferably 40 to 80% by weight, based on the total weight of the absorbent article.

This invention further provides a method for the production of an absorbent resin composition which comprises a step of granulating particles of absorbent resin into particles of an average particle size in the range of 10 to 100 μm and a step of mixing the resultant granulated particles with primary particles of absorbent resin having an average particle size in the range of 150 to 800 μm. The method for granulating the absorbent resin into particles of an average particle size in the range of 10 to 100 μm is not particularly limited but may be selected from among the methods of granulation well known in the art to date. The well-known methods include those of rolling granulation, compression granulation, stirring granulation, extrusion granulation, crushing granulation, fluidized-bed granulation, and spray dray granulation, for example. Among other methods cited above, the method of granulation by extrusion through a spherical die proves particularly advantageous in facilitating the control of the particle size of the produced granulated particles and permitting impartation of large physical integrity to the granulated particles. For the reason adduced above, the average particle size of the granulated particles appropriately is in the range of 150 to 800 μm.

It is advantageous to produce the particles of absorbent resin having an average particle size in the range of 10 to 100 μm by granulation with a polycationic compound and/or a polyhydric alcohol. Properly, the polycationic compound is at least one member selected from the group consisting of poly-ethylene imine, polyamide amine, polyether amine, and polyvinyl amine polyallyl amine. The polyhydric alcohol properly is at least one member selected from the group consisting of ethylene glycol, diethylene glycol, triethylene glycol, polyethylene glycol, glycerin, diglycerin, and polygrlycerin. Appropriately, a polycationic compound and a polyhydric alcohol are used in combination.

In the granulation of particles of absorbent resin having an average particle size in the range of 10 to 100 μm, the procedure which comprises adding the absorbent resin to a polycationic compound and/or a polyhydric alcohol and granulating the resultant mixture in combination with water occasionally proves advantageous in terms of the physical intergrity of the produced granulated particles. The water which is used in the granulation may be deionized water, tap water, or an aqueous solution having an organic or inorganic substance dissolved or suspended therein.

The produced granulated particles may be subjected to a heat treatment. There are times when the granulated particles are enabled to acquire prominent ability to absorb by having ion bonds and covalent bonds formed between the adjacent absorbent resin particles forming the granulated particles. The heat treatment is carried out at a temperature in the range of 40 to 250° C., preferably 90 to 200° C., for a period in the range of 1 to 120 minutes, preferably 10 to 100 minutes.

This invention also contemplates producing the absorbent resin composition by mixing the granulated particles of absorbent resin obtained as described above with the primary particles of absorbent resin. The mixing device to be used for this mixture is not particularly restricted but may be selected from among various mixing devices well known in the art to date. The well-known mixing devices include a cylindrical mixing device, a double wall conical mixing device, a V-shaped mixing device, a ribbon type mixing device, a screw type mixing device, a flowing type mixing device, a rotary disc type mixing device, an air current type mixing device, a twin arm type kneading device, an inner mixing device, a pulverizing type kneading device, a rotary type mixing device, and a screw type extruding device, for example.

Further, the absorbent resin composition or the absorbent article which is obtained by this invention may be vested with a new function by having deodorant, perfume, chemical reagent, plant growth aid, fungicide, foaming agent, pigment, dye, hydro-philic short fibers, and fertilizer incorporated therein.

This invention further provides a method for the production of granulated particles of absorbent resin, characterized by mixing particles of absorbent resin with a granulating agent and extruding the resultant mixture through an extrusion granulating device provided with a spherical perforated plate.

The method of the present invention for the production of granulated particles of absorbent resin begins with the operation of mixing particles of absorbent resin with the granulating agent. The method to be adopted for mixing the particles of absorbent resin with the granulating agent in this invention is not particularly restricted but may be of a type that relies on the use of any of ordinary mixing devices. The mixing devices include a cylindrical mixing device, a double wall conical mixing device, a V-shaped mixing device, a ribbon type mixing device, a screw type mixing device, a flowing type mixing device, a rotary disc type mixing device, an air current type mixing device, a twin arm type kneading device, an inner mixing device, a pulverizing type kneading device, a rotary type mixing device, and a screw type extruding device, for example.

The granulating agent for use in this invention has no particular restriction, excepting it is a compound capable of forming a chemical bond with the functional group possessed by the particles of absorbent resin. It is allowable to use water alone as a granulating agent. An aqueous solution having a chemically bondable substance dissolved in water may be used instead. When a chemically bondable substance is liquid at normal room temperature, the substance may be used by itself as a granulating agent. Among other substances mentioned above, a compound which is capable of forming a covalent bond with the functional group possessed by the particles of absorbent resin proves particularly advantageous in terms of such absorption properties of the produced granulated particles as physical integrity and speed of absorption. To be specific, the granulating agent appropriately is at least one compound which is selected from the group consisting of polyhydric alcohols, amino group-containing compounds, amide group-containing compounds, and carboxyl group-containing compounds and is possessed of water-solubility. Preferably, it is at least one substance selected from among glycerin, diglycerin, polyglycerin, polyvinyl alcohol, β-alanine, urea, polyaspartic acid, and polyamide polyamine epihalohydrin resin. Glycerol, diglycerol, and polyglycerol which are polyhidric alcohols are more proper compounds. Glycerin is an especially proper compound.

The term "water-solubility" as used in this invention refers to the state of a granulating agent in which the agent added in an amount of 30 parts to 100 parts of an aqueous 50 wt % glycerin solution avoids precipitating in the solution. Though the amount of the granulating agent to be used in this invention has no particular restriction, it is appropriately in the range of 2 to 30 parts by weight, preferably 5 to 20 parts by weight, based on 100 parts by weight of the particles of absorbent resin in consideration of the various absorption properties of the granulated particles of absorbent resin to be obtained by this invention. If the amount of the granulating agent is less than 2 parts by weight, the produced granulated particles will possibly fail to acquire uniform particle size and sufficient physical intergrity. Conversely, if this amount exceeds 30 parts by weight, the excess will not easily add proportionately to the effect aimed at, will rather increase the proportion of the granulating agent suffered to remain unaltered, and will go to degrade the flowability.

This invention subsequently causes the mixture of the particles of absorbent resin and the granulating agent to be granulated by extrusion by means of an extrusion granulating agent. The mixture, when necessary, may be subjected to an aging treatment prior to the granulation by extrusion. The aging treatment can be implemented by allowing the mixture to stand at rest under the conditions of 50 to 90° C. and RH 30 to 90% for a period in the range of 10 minutes to 2 hours. The aging treatment of this nature can be expected to improve the uniformity of the various absorption properties of the granulated particles of absorbent resin to be obtained ultimately.

The term "extrusion granulation" as used in this invention literally refers the manufacture of granules, namely an operation of producing particles substantially uniform in shape and size from a powdery raw material. It is not intended to mean manufacture of a film or sheet by extrusion molding or compression molding.

The extrusion granulating device provided with a spherical perforated plate which is used in this invention has no particular restriction, except that it comprises an extruding part and a die or screen which is formed in a spherical shape and adapted to permit extrusion of a given material and give rise to granules of a fixed size. As typical examples of the extrusion granulating device which is effectively used herein, a screw front extrusion type granulating device, a screw lateral extrusion type granulating device, a screw vacuum extrusion type granulating device, a screw combination pretreating and extrusion granulating device, a roll ring die type extrusion granulating device, a blade basket type extrusion granulating device, a blade oscillating type extrusion granulating device, a self-molding gear type extrusion granulating device, and a self-molding cylinder type extrusion granulating device may be cited. Among other extrusion granulating devices cited above, the screw front extrusion type granulating device and the screw lateral extrusion type granulating device prove particularly advantageous. The screw front extrusion granulating device proves more preferably.

The term "spherical perforated plate" as used herein refers to a member provided with a multiplicity of holes for producing granulated particles of a fixed size. It is used to designate a planar die or screen in popular use. In the case of a screw front extrusion type granulating device, for example, this terms refers to a hemispherical die which is positioned in the leading end part of the screw. In the case of the screw lateral extrusion type granulating device, the term refers to a screen of the shape of a curved surface which is positioned in the peripheral part of the screw. Preferably, the extrusion vanes in this device have a spherical shape, namely a shape such that the contour of their edges forms part of a sphere.

The conventional planar die or screen is designed to have a wall thickness exceeding 5 to 8 mm. The die or screen which contains holes of a small size, therefore, incurs difficulty in allowing extrusion of the mixture. If the holes perforated in the die or screen have an unduly small size, the ability of the die or screen to granulate the mixture will be notably degraded and, in the worst case, the holes in the die or screen will be clogged with the raw material so seriously as to render the die or screen unserviceable any longer. If the die or screen is formed in a reduced wall thickness for the purpose of exalting the ability thereof to granulate, it will inevitably sustain breakage because the strength thereof is unduly low relative to the extruding pressure. In the part of the die or screen in which hole size are large, the granulated particles produced therethrough have only weak physical integrity and such size as are unfit for a hygienic material.

By forming the die or screen in a spherical shape and giving an overall spherical contour to the leading ends of the extrusion vanes, it is made possible to enable the extrusion granulation to proceed easily even with a die containing holes of a small size, enhance the productivity of the granulation, and obtain the granulated particles having high physical integrity and an arbitrary particle size. The term "sphere" embraces a wide range of surfaces excluding a plane such as the surfaces formed by the rotation of circles such as true circles and ellipses, the surfaces formed by the rotation of the combination of a plurality of circles, the hemispheres, the curved surfaces, the hyperbolic surfaces, and the hyperboloidal surfaces.

The shape of the holes in the die or screen need not be particularly restricted but may be arbitrarily selected from among true circles, ellipses, and polygons such as triangles and hexagons, whichever best suits the purpose of use. The size of the holes (in the case of true circles) has no particular restriction. When the absorbent resin composition is used for a hygienic material, for example, the size appropriately is in the range of 0.3 to 1.5 mm, preferably 0.3 to 0.8 mm. If this size is less than 0.3 mm, the extrusion will not be easily obtained efficiently and the granulated particles obtained at all, when used for a hygienic material, will be so minute as possibly impair the fluid permeability of the granulated particles of absorbent resin. Conversely, if the size is larger than 1.5 mm, the granulated particles eventually obtained will be unduly large and, therefore, will possibly necessitate an extra step for disintegration or pulverization until they are reduced to a size fit for the purpose of use.

By suitably selecting the size of such holes in the die or screen as mentioned above, the method of this invention for the production of the granulated particles is enabled to obtain cylindrical granulated particles of absorbent resin having very small size and a very narrow particle size distribution in the range of 0.4 to 0.5 mm or 0.6 to 0.7 mm, for example, which fits for a hygienic material.

The thickness of the die or screen is not particularly restricted. Because of the characteristics of the extruding device, when the size of the holes is decreased, the die or screen possibly fails to allow extrusion granulation unless the thickness thereof is decreased. Appropriately, the thickness of the die or screen is in the approximate range of 0.1 to 5 times, preferably 0.2 to 3 times, and more preferably 0.5 to 2 times, the size of the holes. If the thickness of the die or screen is larger than 5 times the size of the holes, the resistance offered at the hole parts is so large as to impede the granulation by extrusion. Conversely, if the thickness is smaller than 0.1 times the size of the holes, the granulating strength will possibly decline.

Now, "the gap between the die or screen and the extruding part in the extrusion granulating device" will be described below with reference to the screw front extrusion type granulating device and the screw lateral extrusion type granulating device. The front extrusion type granulating device has a straight screw as an extruding part thereof. The interval between this straight screw and the die is referred to as a pressure balancing part. The thickness of this pressure balancing part answers the expression "gap between the die and the extruding part" as used in this invention. The screw lateral extrusion type granulating device has a straight screw thereof circumscribed by a screen. The interval between the screen and the straight screw answers the expression "gap between the die and the extruding part" as used in the present invention.

This gap has no particular restriction. If this gap is unduly large, however, the extrusion granulation will possibly fail to proceed. Advantageously, the gap is not more than 20 times, preferably not more than 10 times, and more preferably not more than 5 times, the diameter of the holes. Advantageously from the practical point of view, the die or screen and the extruding part approximate closely each other to such an extent as avoids shortening the service life of the die or screen. If they directly contact each other, the extruding part which is in motion will rub against the die or screen and inevitably shorten the service life thereof. The extrusion granulating devices of the ring dye type, disk die type, oscillating type, and basket type which have a die or screen so sturdy as to defy breakage even in the substantial absence of a gap between itself and the extruding part (in the presence of direct contact therebetween) will incur no problem if the interval is totally absent.

Figure 1:
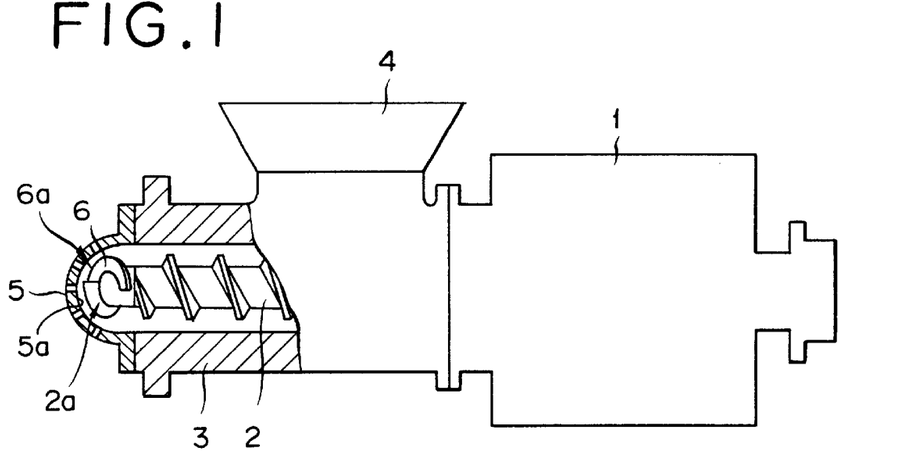
FIG. 1 is a schematic diagram showing the construction of one example of the granulating device to be used in the method of this invention for the production of granulated particles.

FIG. 1 schematically shows the construction of a screw front extrusion granulating device which is provided with such a spherical die as mentioned above. In this granulating device, a feed screw 2 serving as an extruding part is accommodated in a screw case 3 as connected to a drive part (not shown) through the medium of a gear mechanism disposed in a gear box 1. The screw case 3 is provided in the top part thereof with a feed hopper 4 for admitting a raw material and the screw case 3 is provided in the front part thereof with a spherical die 5. The feed screw 2 has the leading end part thereof formed in a spherical shape and the spherically shaped leading end part 2a is provided with one or more spherically shaped extruding vanes 6. Edges 6a of the spherically shaped extruding vanes 6 have an overall contour conforming with a spherically shaped rear face 5a of the spherically shaped die and, at the same time, are spirally formed on the surface of the spherically shaped leading end part 2a. As a result, a gap of an equal size is interposed between the locus of rotation of the edges 6a of the spherical extruding vanes 6 and the spherically shaped rear face 5a throughout the entire rear face 5a.

The method of the present invention for the production of granulated particles obtains the granulated particles as aimed at by subjecting the mixture of particles of absorbent resin with a granulated agent to the action of such an extrusion granulating device as described above. The granulated particles which are emitted from the extrusion granulating device, when necessary for the purpose of uniformizing the size distribution thereof, maybe subjected to a size-uniformizing treatment.

Advantageously, this size-uniformizing treatment is carried out continuously on the granulated particles by the use of a size-uniformizing device as soon as the granulated particles are discharged from the extrusion granulating device so as to repress the occurrence of a fine powder from the granulated particles (aggregates) to the fullest possible extent, namely while the granulated particles are still retaining high plasticity. The size-uniformizing device to be used is not particularly limited. A size-uniformizing device which is provided coaxially within a cylindrical housing thereof with a rotatable size-uniformizing disk and further provided with a plurality of nozzles communicating with an external air feed mechanism and opening into the internal wall of the cylindrical housing and adapted to inject air into the housing through the plurality of nozzles and form a swirl of jet air inside the housing is advantageously used. In this size-uniformizing device, the raw material (granulated particles) which is fed into the cylindrical housing through the hopper disposed in the upper part of the housing is uniformized in size by being uniformly diffused inside the housing by a dispersing disk disposed above the size-uniformizing disk and kept in rotation and consequently exposed to the rotating action produced by the size-uniformizing disk and the pulverizing and uniformizing action produced by the jet air spouted out of the nozzles.

Further, the size-uniformizing device constructed as described above brings about an effect of precluding the otherwise possible cohesion of the freshly produced granulated particles because the jet air removes the granulating agent adhering to the surface of the granulated particles.

In the method of the present invention for the production of granulated particles, the granulated particles which are obtained by the extrusion granulating device may be subsequently subjected to a heat treatment.

The method for performing this heat treatment in this invention is not particularly limited. Standard drying devices and heating furnaces such as, for example, a groove stirring drying device, a rotary drying device, a fluidized-bed drying device, an air current drying device, an infrared drying device, and an inducting heating device may be used for the purpose of the heat treatment. In consequence of this heat treatment, the granulated particles are possibly vested with high physical integrity, enabled to retain shape even after absorbing a liquid, prevented from regenerating a fine powder, and improved in various absorption properties such as the absorption speed and the fluid permeability. It is advantageous for the purpose of acquiring a particle size aimed at to repress the shearing strength and the crushing strength during the course of this heat treatment to the fullest possible extent. Among the other methods of heat treatment mentioned above, the fluidized-bed drying and the air current drying prove particularly advantageous.

Appropriately, the heating temperature is in the range of 90 to 250° C. preferably 120 to 220° C. If the heating temperature is less than 90° C., the physical integrity will possible decline. Conversely, this heating temperature exceeds 250° C., the absorbent resin will have the possibility of succumbing to thermal deterioration, depending on the kind of absorbent resin to be used.

In the method of the present invention for the production of granulated particles, the granulated particles obtained by the extrusion granulating device may be subsequently treated with such ionizing radiation as the electron beam or the γ ray. In consequence of this treatment with the ionizing radiation, the granulated particles are possibly vested with high physical integrity, enabled to retain shape even after absorbing a liquid, prevented from regenerating a fine powder, and improved in various absorption properties such as the absorption speed and the fluid permeability.

The dosage of the radiation to be absorbed appropriately is in the range of 1 to 1000 kGy (0.1 to 100 Mrads), preferably 10 to 500 kGy (1 to 50 Mrads). If this dosage is less than 1 kGy, the physical integrity will possibly decline. Conversely, if the dosage exceeds 1000 kGy, the absorbent resin will possible incur a decrease in the absorption capacity, depending on the kind of absorbent resin to be used.

This invention further provide granulated particles of absorbent resin having an aspect ratio (major size/minor size) of not less than 1.5. The granulated particles of absorbent resin which answer this description are obtained, for example, by the method of the present invention for the production of granulated particles of absorbent resin. The granulated particles of this invention described above typically are in a cylindrical shape, namely the shape of columns (such as, for example, circular columns from circular holes, tetragonal columns from tetragonal holes, triangular columns from triangular holes, etc. respectively in a die). These shapes have never been contemplated for the particles of absorbent resin. The granulated particles of this invention, as compared with the conventional particles of absorbent resin, are easily caught and immobilized while being blended with other material and are allowed to succumb to a uniform surface treatment because of relatively uniform shape and size. Thus, the produced granulated particles of absorbent resin is vested with satisfactory absorption speed and fluid permeability, enabled to retain shape even after absorbing a liquid, and precluded from regeneration of a fine powder and, therefore, are advantageously used for such hygienic materials as disposable diapers.

The granulated particles of absorbent resin of the present invention have an aspect ratio of not less than 1.5 as described above and are obtained in various shapes such as columns, bars, and threads. Those granulated particles that are shaped like columns are advantageously used for hygienic materials. These columns appropriately have an aspect ratio in the range of 1.5 to 200, preferably 2 to 100, and more preferably 5 to 50. The columns having an aspect ratio exceeding 200 are not easily obtained from the practical point of view and those having an aspect ratio of less than 1.5possibly incur difficulty in being immobilized. When the absorbent resin article is intended for hygienic materials, the holes in the die or screen advantageously have a size in the approximate range of 0.3 to 1.0 mm, preferably 0.4 to 0.8 mm. If the size of the holes is less than 0.3 mm, the granulated particles are so thin as to incur a reduction in fluid permeability. Conversely, if the size exceeds 1.0 mm, the granulated particles, when used for hygienic materials, will be possibly at a disadvantage in necessitating an extra work of disintegration or pulverization. The granulated particles of absorbent resin of this invention advantageously have a speed of absorption of not more than 40 second, preferably not more than 20 seconds, as determined by the method to be described herein below.

Now, this invention will be described more specifically below with reference to working examples. It should be noted, however, that this invention is not limited in any sense by these examples. Such terms as the fluid permeability, speed of absorption, absorption capacity under load, apparent gel expansion ratio, average particle size, particle size distribution, absorption capacity, and physical intergrity as used in the specification with respect to the absorbent resin compositions and the granulated particles of absorbent resin were determined by the following methods.

(1) Fluid permeability

In a glass tube measuring 16 mm in inside size and 18 cm in length and having the lower part thereof closed with a silicone rubber stopper, 0.500 g of a given absorbent resin composition or granulated particles of absorbent resin was placed and 30 ml of artificial urine was added thereto. Then, the sample wetted with the artificial urine in the glass tube, with the upper part of the tube closed with a silicone rubber stopper, was left standing at rest for 30 minutes. Then, the glass tube, with the silicone rubber stopper removed from the bottom part thereof, was set upright on a 48-mesh metal net placed on a beaker and, with the silicone rubber stopper removed from the upper part thereof, left standing at rest on the net for 10 minutes. Ten (10) ml of artificial urine was added to the tube through the upper part thereof. The interval between the time the artificial urine was added to the tube and the time the meniscus of the gradually descending artificial urine reached the upper surface of the gel was clocked and reported as the permeability to liquid of the sample. The satisfactoriness of the fluid permeability increases in proportion as the interval decreases. The artificial urine used in this experiment was produced by combining 7 g of potassium chloride, 7 g of sodium sulfate, 2.975 g of ammonium dihydrogen phosphate, 0.525 g of diammonium hydrogen phosphate, 0.875 g of potassium chloride (dihydrate), and 1.75 g of magnesium chloride (hexahydrate) and diluting the resultant mixture with deionized water to a total volume of 3.5 kg.

(2) Speed of absorption

On the bottom of a standard test tube 0.5 inch in size, 0.450 g of a given absorbent resin composition was placed. At the same time that 12.6 g of the artificial urine mentioned above was added to the test tube supported upright, a stop watch was started. The stop watch was stopped at the exact moment that the ascending mass of gel reached the bottom of the meniscus of the liquid in the test tube. The weight of the artificial urine per unit gram of the sample, i.e. 28 g/g, was divided by the interval required for obtaining the speed of absorption and clocked in seconds.

Separately, granulated particles of absorbent resin were tested for speed of absorption by the following method.

A beaker, 100 ml in inner volume, containing 50 ml of physiological saline solution (aqueous 0.9 wt % sodium chloride solution) (adjusted to 30° C.) was set on a stirrer and a stirrer tip was set rotating at 600 rpm. A stop watch was started when 2.00 g of given granulated particles of absorbent resin weighed out on a balance were thrown instantaneously into the beaker. The stop watch was stopped at the time that the stirrer tip exposed at the central part of the current of solution was hidden with the granulated particles of absorbent resin (a gel). The dial reading of the stop watch was noted.

(3) Absorption capacity under load

Figure 2:
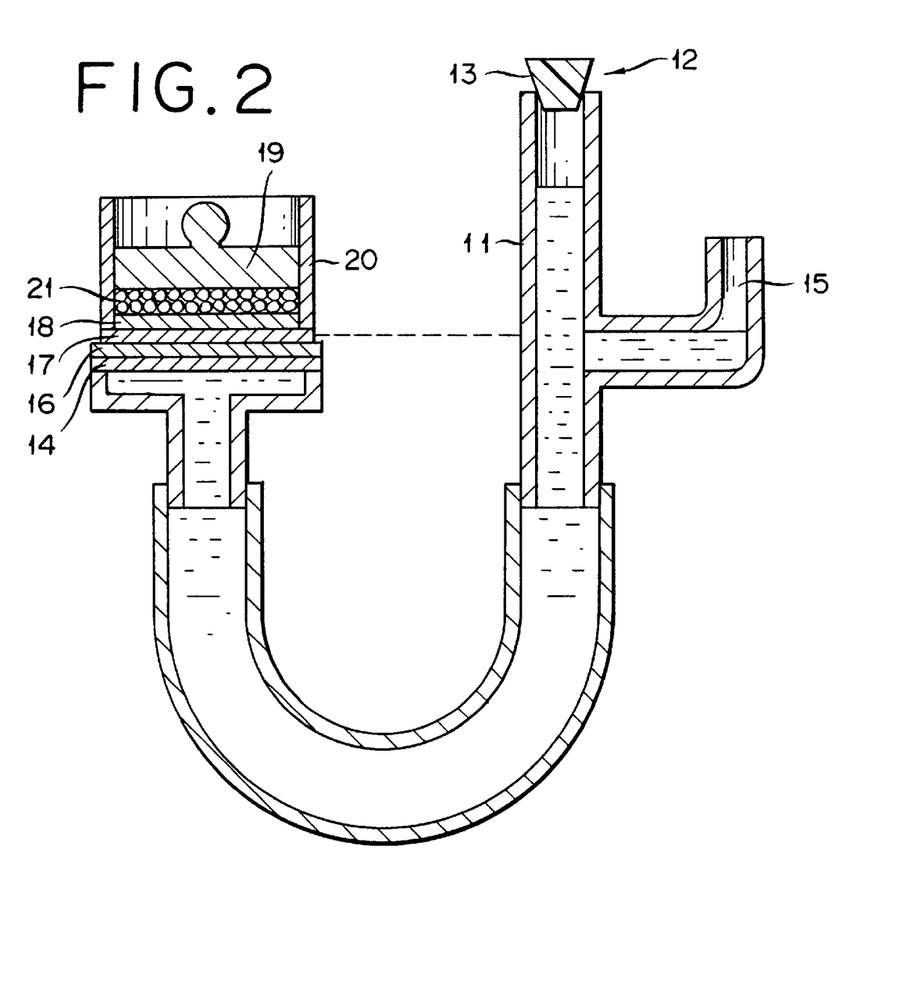
FIG. 2 is a cross section of the device for determining the absorption capacity under load used in the present invention.

The absorption capacity under load was determined by the use of a device for testing an absorbent resin composition under load which is shown in an explanatory cross section (FIG. 2).

To be specific, a stopper 13 was set fast in an upper mouth 12 of a buret 11 filled with artificial urine (a solution of 1.9% by weight of urea, 0.8% by weight of sodium chloride, 0.1% by weight of calcium chloride, and 0.1% by weight of magnesium sulfate in deionized water), a measuring stand 14 and an air inlet 15 were set flush with each other, and a filter paper 17 was placed on a glass filter (No. 1) 16 measuring 70 mm in size and inserted in the measuring stand 14. Separately, a non-woven fabric 18 was fixed in the lower end part of a supporting cylinder 20 measuring 55 mm in size. On the non-woven fabric 18, 0.2 g of an absorbent resin composition 21 was uniformly scattered and a load 19 of 20 g/m² was superposed on the scattered layer of the composition. Then, the supporting cylinder now holding the non-woven fabric, the absorbent resin composition, and the load in place was seated on the filter paper 17 overlying the glass filter 16 and left standing at rest thereon. Then, the amount (A ml) of the artificial urine which the absorbent resin composition had absorbed through the filter paper 17 was read from the buret and used in the following formula for calculation of the absorption capacity under load (ml/g).

Absorption capacity under pressure (ml/g)=A (ml)/0.2 (g)

(4) Apparent gel expansion ratio

In a measuring cylinder 10 mm in inside size (13 mm in outside size and 17 cm in length) and 10 ml in inner volume, 0.5 g of given granulated particles of absorbent resin were placed and 5 g of deionized water was added thereto, and they were left standing at rest therein for about 10 minutes. The numerical value which was found by calculating the following formula using the volume of the gel formed in 10 minutes of the standing was reported as the apparent coefficient of cubical expansion.

Apparent gel expansion ratio(%)=[(volume of gel/volume of added water)−1]×100

This apparent expansion ratio represents a numerical value which is thought to be in proportion to the total volume of voids in the swelled gel. This numerical value increases in accordance as the voids which are formed when the granulated particles swell without forming wet clusters and which are utilized for permeation of liquid increase.

(5) Average particle size

The average particle size of given granulated particles of absorbent resin was determined by classifying the granulated particles with JIS (Japanese industrial standard) standard sieves (20 mesh, 32 mesh, 48 mesh, 60 mesh, 100 mesh, 145 mesh, 200 mesh, and 350 mesh), plotting residual percentage points, R, on a logarithmic probability chart, and finding a particle size corresponding to R=50%. This particle size was reported as the average particle size.

(6) Particle size distribution

Standard 4-mesh, 14-mesh, 20-mesh, 50-mesh, and 100-mesh sieves 70 mm in size and receiving plates as classifying plates were superposed. Thirty (30) g of given granulated particles of absorbent resin were placed on the uppermost sieve. The superposed sieves were shaken with a classifier for 10 minutes. The samples collected in the classifying plates were weighed and the results of weighing were reported in % by weight.

(7) Absorption capacity

In a pouch (40 mm×150 mm) made of non-woven fabric after the fashion of a tea bag, about 0.1 g of given granulated particles of absorbent resin were placed evenly. This pouch was immersed in a large excess of physiological saline solution (aqueous 0.9 wt % sodium chloride solution) and allowed to be swelled with the solution for 30 minutes. It was then removed from the solution, drained, and weighed. A blank pouch was subjected to the same procedure. The absorption capacity was calculated from the following formula using the weight of the blank pouch found at the end of the procedure.

Absorption capacity (g/g)=[Weight after absorption (g)−Blank (g)]/Weight of granulated particles of absorbent resin used(g) in the test (8) Physical integrity About 50 cm$^3$ (about 30 g) of given granulated particles of absorbent resin as a sample were accurately weighed (Mo). In each of four glass vials (55 mm in size×110 mm) having an inner volume of 250 ml, 10 g of glass marbles (6 to 7 mm in size) and the sample were placed. Then, the glass vials were closed with a stopper. The four glass vials were set on a paint shaker (made by Toyo Seiki K.K.). The paint shaker was operated for about 30 minutes and then stopped.

The glass vials were removed from the paint shaker. The sample was removed from each glass vial and filtered with slight tap through a sieve 150 μm in mesh size (produced by Iida Seisakusho K.K.). The mass of the absorbent resin (M) which remained on the sieve was weighed. The Physical integrity of the sample was calculated from the following formula.

Physical integrity=(M/Mo)×100 wherein Mo stands for the mass (g) of sample and M for the mass of the sample remaining on the sieve (g).

Referential Example 1

In a jacketed stainless steel twin arm kneader provided with two sigma vanes and having an inner volume of 10 liters, 4400 g of an aqueous solution of a monomer component composed of 75 mol % of sodium acrylate and 25 mol % of acrylic acid (concentration of monomer component 37% by weight) and 2.72 g of trimethylol propane triacrylate (0.05 mol % based on the monomer component) as a cross-linking agent were placed and nitrogen gas was blown in to displace the interior of the reaction system with nitrogen. Then, the two sigma vanes were rotated and hot water at 30° C. was meanwhile passed through the jacket to heat the interior of the reaction system and 1.10 g of sodium persulfate and 1.10 g of sodium sulfite were added as initiator to the reactants. As the polymerization consequently advanced, the aqueous monomer solution formed soft hydrogel, which was gradually divided by the rotation of the vanes. After the elapse of 40 minutes following the start of the polymerization, the hydrogel polymer was divided into particles about 1.9 mm in average particle size. On a metal net, the hydrogel polymer was dried with hot air at a temperature of 150° C. for 2 hours. The dried mass was crushed with a hammer and then passed through a 40-mesh metal net (having a mesh size of 425 μm) to obtain Referential Absorbent Resin (1). The properties of Referential Absorbent Resin (1) are shown in Table 1.

Referential Example 2

In a mixing device (produced by Hosokawa Micron K.K. and marketed under trademark designation of "Turbulizer TX-14"), 100 parts by weight of Referential Absorbent Resin (1), 0.5 part by weight of glycerin, 2 parts by weight of water, and 0.5 part by weight of isopropyl alcohol were mixed. The resultant mixture was continuously heat-treated with a paddle drier (produced by Nara Kikai K.K. and marketed under product code of "NPD-6W"). The average retention time of the mixture in this paddle drier was 20 minutes. The temperature of the material at the outlet of the drier was 190° C. Consequently, Referential Absorbent Resin (2) was obtained. The properties of Referential Absorbent Resin (2) are shown in Table 3.

EXAMPLE 1

One hundred (100) parts by weight of Referential Absorbent Resin (2) obtained in Referential Example 2 was classified with a 200-mesh metal net (mesh size of 75 μm). The part of resin stopped on the metal net was labeled as primary particles (a) of absorbent resin and the part passed through the metal net as absorbent resin (a). The primary particles (a) of absorbent resin accounted for 92 parts by weight and the absorbent resin (a) for 8 parts by weight. The primary particles (a) of absorb-ent resin had an average particle size of 210 μm and the absorbent resin (a) had an average particle size of 32 μm.

In a mixer (produced by L odige Corp. and marketed under trademark designation of L odige Mixer M5R"), 100 parts by weight of the absorbent resin (a), 5 parts by weight of glycerin, and 10 parts by weight of an aqueous 50% solution of polyethylene imine having a weight average molecular weight of about 70,000 (produced by Nippon Shokubai Co., Ltd. and marketed under trademark designation of "Epomin P-1000") were mixed for about 30 minutes. The resultant mixture was granulated by extrusion through a screw front extrusion type granulating device provided with a spherical die containing holes 0.6 mm in size (produced by Fuji Paudal Co., Ltd. and marketed under trademark designation of "Dome Gran DG-L1") The produced granules were heat treated in a drier at 90 ° C. for about one hour to obtain granulated particles (a) of absorbent resin. The granulated particles (a) thus obtained had an average particle size of 450 µm. A plastic bag, after containing 8 parts by weight of the granulated particles (a) and 92 parts by weight of the primary particles (a) of absorbent resin therein, was held in a hand and swung round to mix the two kinds of particles and obtain an absorbent resin composition (1). The properties of the absorbent resin composition (1) are shown in Table 1.

EXAMPLE 2

A plastic bag, after containing 20 parts by weight of the granulated particles (a) and 80 parts by weight of the primary particles (a) of absorbent resin both obtained in Example 1, was held in a hand and swung round to mix the two kinds of particles and obtain an absorbent resin composition (2). The properties of the composition (2) are shown in Table 1.

EXAMPLE 3

One hundred (100) parts by weight of Referential Absorbent Resin (2) obtained in Referential Example 2 was classified with a 100-mesh metal net (mesh size of 150 µm). The part of resin stopped on the metal net was labeled as primary particles (b) of absorbent resin and the part passed through the metal net as absorbent resin (b). The primary particles (b) of absorbent resin accounted for 85 parts by weight and the absorbent resin (b) for 15 parts by weight. The primary particles (b) of absorbent resin had an average particle size of 220 µm and the absorbent resin (b) had an average particle size of 84 µm.

In a mixer (produced by L odige Corp. and marketed under trademark designation of "L odige Mixer M5R"), 100 parts by weight of the absorbent resin (b), 5 parts by weight of glycerin, and 10 parts by weight of an aqueous 50% solution of polyethylene imine having a weight average molecular weight of about 70,000 (produced by Nippon Shokubai Co., Ltd. and marketed under trademark designation of "Epomin P-1000") were mixed for about 30 minutes. The resultant mixture was granulated by extrusion through a screw front extrusion type granulating device provided with a spherical die containing holes 0.6 mm in size (produced by Fuji Paudal Co., Ltd. and marketed under trademark designation of Dome Gran DG-L1") The produced granules were heat treated in a drier at 90 ° C for about one hour to obtain granulated particles (b) of absorbent resin. The granulated particles (b) thus obtained had an average particle size of 550 µmm. A plastic bag, after containing 15 parts by weight of the granulated particles (b) and 85 parts by weight of the primary particles (b) of absorbent resin therein, was held in a hand and swung round to mix the two kinds of particles and obtain an absorbent resin composition (3). The properties of the absorbent resin composition (3) are shown in Table 1.
Control 1
The referential absorbent resin (2) was labeled as an absorbent resin (1) for comparison. The properties of this resin are shown in Table 1.
Control 2
In a mixer (produced by L odigeCorp. and marketed under trademark designation of L odige Mixer M5R"), 100 parts by weight of the referential absorbent resin (2), 0.4 part by weight of glycerol, and 0.8 part by weight of an aqueous 50% solution of polyethylene imine having a weight average molecular weight of about 70,000 (produced by Nippon Shokubai Co., Ltd. and marketed under trademark designation of "Epomin P-1000") were mixed for about 30 minutes. The resultant mixture was heat treated in a drier at 90° C. for about one hour to obtain an absorbent resin composition (2) for comparison. The properties of the absorbent resin composition (2) for comparison are shown in Table 1.

TABLE 1

|  | Speed of absorption (g/g/sec) | Fluid permeability (sec) | absorption capacity under load (ml/g) |
| --- | --- | --- | --- |
| Absorbent resin composition (1) of invention | 0.66 | 300 | 28 |
| Absorbent resin composition (2) of invention | 0.78 | 310 | 28 |
| Absorbent resin composition (3) of invention | 0.72 | 270 | 29 |
| Absorbent resin composition (1) for comparison | 0.34 | 600 | 24 |
| Absorbent resin composition (2) for comparison | 0.35 | 560 | 25 |

It is clearly noted from Table 1 that the absorbent resin compositions obtained in the working examples of this invention each had a high speed of absorption, excelled in fluid permeability, and showed a high absorption capacity under load.

EXAMPLE 4

In a mixer, 100 parts by weight of the absorbent resin composition (1) obtained in Example 1 and 100 parts by weight of ground pulp were dry mixed. Then, the resultant mixture was pneumatically spread in the shape of sheet on a wire screen by the use of a batch air sheet-producing device to obtain a web measuring 10 cm×20 cm. The web thus obtained was sandwiched between vertically opposed tissue papers having a basis weight of 0.0013 g/cm$^2$. Then, the sandwiched web was pressed under a load of 2 kg/cm$^2$ for one minute to obtain an absorbent article (1) having a basis weight of about 0.05 g/cm$^2$.
Control 3 An absorbent article (1) for comparison was obtained by following the procedure of Example 4 while using the absorbent resin composition (1) for comparison in the place of the absorbent resin composition (1).

Sixty (60) g of the artificial urine was poured onto the central part each of the absorbent article (1) and the absorbent article (1) for comparison obtained as described above from the non-woven fabric side thereof and allowed to be absorbed by the absorbent article. After one hour's standing in the presence of the artificial urine, the absorbent article (1) and the absorbent article (1) for comparison were touched on the non-woven fabric side with a hand. By comparison, the absorbent article (1) was found to give a higher sensation of dryness.

EXAMPLE 5

By means of a screw type mixer, 100 parts by weight of the absorbent resin (2) for reference obtained in Referential Example 2, 5 parts by weight of glycerin, and 17 parts by weight of polyamide polyamine epichlorohydrin resin were mixed. The resultant mixture was granulated by extrusion through a screw front extrusion type granulating device provided with a spherical die containing holes 0.6 mm in size (die thickness 0.6 mm and gap between the extruding part and the die 1 mm) (produced by Fuji Paudal Co., Ltd. and marketed under trademark designation of "Dome Gran" ). The granules thus obtained were treated by means of a wet continuous size-uniformizing device (produced by Fuji Paudal Co., Ltd. and marketed under trademark designation of "Turbo Comminutor") toobtain granulated particles (1) of absorbent resin. The properties of the granulated particles (1) of absorbent resin are shown in Table 2.

EXAMPLE 6

Granulated particles (2) of absorbent resin were obtained by repeating the procedure of Example 5 while using 10parts byweight ofpolyaspartic acid (aqueous 50% solution, molecular weight 5,000) in the place of the polyamide polyamine epichloro-hydrin resin. The properties of the granulatedparticles (2) of absorbent resin are shown in Table 2.

EXAMPLE 7

Granulated particles (3) of absorbent resin were obtained by repeating the procedure of Example 5 while using 5 parts by weight of urea and 5 parts by weight of water in the place of the polyamide polyamine epichloro-hydrin resin. The properties of the granulated particles (3) of absorbent resin are shown in Table 2.

EXAMPLE 8

By means of a screw type mixer, 100 parts by weight of the absorbent resin (2) for reference obtained in Referential Example 2, 5 parts by weight of polyvinyl alcohol (molecular weight 20,000), 5 parts by weight of glycerin, and 5 parts by weight of water were mixed. The resultant mixture was granulated by extrusion through a screw front extrusion type granulating device provided with a spherical die containing holes 0.6 mm in size (die thickness 0.6 mm and gap between the extruding part and the die 1 mm) (produced by Fuji Paudal Co., Ltd. and marketed under trademark designation of "Dome Gran" ). The granules thus obtained were treated by means of a wet continuous size-uniformizing device (produced by Fuji Paudal Co., Ltd. and marketed under trademark designation of "Turbo Comminutor") to obtain granulated particles (4) of absorbent resin. The properties of the granulated particles (4) of absorbent resin are shown in Table 2.

EXAMPLE 9

Granulated particles (5) of absorbent resin were obtained by repeating the procedure of Example 7 while using 5 parts by weight of diglycerin in the place of the urea. The properties of the granulated particles (5) of absorbent resin are shown in Table 2.

EXAMPLE 10

Granulated particles (6) of absorbent resin were obtained by repeating the procedure of Example 7 while using 5 parts by weight of polyglycerin in the place of the urea. The properties of the granulated particles (6) of absorbent resin are shown in Table 2.

EXAMPLE 11

Granulated particles (7) of absorbent resin were obtained by repeating the procedure of Example 7 while using 5 parts by weight of ethylene glycol in the place of the urea. The properties of the granulated particles (7) of absorbent resin are shown in Table 2.

EXAMPLE 12

Granulated particles (8) of absorbent resin were obtained by repeating the procedure of Example 7 while using 5 parts by weight of -alanine in the place of the urea. The properties of the granulated particles (8) of absorbent resin are shown in Table 2.

EXAMPLE 13

Granulated particles (9) of absorbent resin were obtained by repeating the procedure of Example 5 while using 10 parts byweight of polyethylene imine (aqueous 50% solution, molecular weight 70,000) in the place of the polyamide polyamine epichloro-hydrin resin. The properties of the granulated particles (9) of absorbent resin are shown in Table 2.

EXAMPLE 14

Granulated particles (10) of absorbent resin were obtained by repeating the procedure of Example 7 while using 5 parts by weight of triethanol amine in the place of the urea. The properties of the granulated particles (10) of absorbent resin are shown in Table 2.

EXAMPLE 15

Granulated particles (11) of absorbent resin were obtained by repeating the procedure of Example 8 while using 5 parts by weight of polyacrylic acid (molecular weight 800,000) in the place of the polyvinyl alcohol. The properties of the granulated particles (11) of absorbent resin are shown in Table 2.

EXAMPLE 16

Granulated particles (12) of absorbent resin were obtained by repeating the procedure of Example 7 while using 5 parts by weight of asparagine in the place of the urea. The properties of the granulated particles (12) of absorbent resin are shown in Table 2.

EXAMPLE 17

Granulated particles (13) of absorbent resin were obtained by repeating the procedure of Example 7 while using 5 parts by weight of L-ascorbic acid in the place of the urea. The properties of the granulated particles (13) of absorbent resin are shown in Table 2.

Control 4

Granulated particles (1) of absorbent resin for comparison were obtained by repeating the procedure of Example 5 while omitting the use of the granulating agent (glycerin and an aqueous polyamide polyamine epichlorohydrin resin solution). The properties of the granulated particles (1) of absorbent resin for comparison are shown in Table 2.

Control 5

Granulated particles (2) of absorbent resin for comparison were obtained by repeating the procedure of Example 5 while omitting the granulation by extrusion by means of a screw front extrusion type granulating device provided with a spherical die. The properties of the granulated particles (2) of absorbent resin for comparison are shown in Table 2.

Control 6

Granulated particles (3) of absorbent resin for comparison were obtained by repeating the procedure of Example 5 while switching the screw front extrusion type granulating device provided with a spherical die to a conventional screw front extrusion type granulating device provided with a die containing holes 3.1 mm in size (die thickness 5 mm and gap between the extruding part and the die 5 mm) (produced by Hiraga Kosakusho K.K. and marketed under trademark designation of "Chopper, Model No. 32E"). The properties of the granulated particles (3) of absorbent resin for comparison are shown in Table 2.

Control 7

Granules were obtained by repeating the procedure of Example 5 while switching the screw front extrusion type granulating device provided with a spherical die to a conventional screw front extrusion type granulating device provided with a die containing holes 3.1 mm in size (die thickness 5 mm and gap between the extruding part and the die 5 mm) (produced by Hiraga Kosakusho K.K. and marketed under trademark designation of "Chopper, Model No. 32E"). The granules thus obtained were disintegrated on a 20-mesh metal net until they were wholly passed through the metal net to obtain granulated particles (4) of absorbent resin for comparison. The properties of the granulated particles (4) of absorbent resin for comparison are shown in Table 2

Control 8

When the procedure of Example 5 was repeated excepting the screw front extrusion type granulating device provided with a spherical die was switched to a conventional screw front extrusion type granulating device provided with a die containing holes 1.2 mm in size (die thickness 5 mm and gap between the extruding part and the die 5 mm) (produced by Hiraga Kosakusho K.K. and marketed under trademark designation of "Chopper, Model No. 32E"), the mixture being granulated clogged the holes in the die and could not be extruded through the die.

EXAMPLE 18

By means of a screw type mixer, 100 parts by weight of the absorbent resin (1) for reference obtained in Referential Example 1 and 10 parts by weight of glycerin were mixed. The resultant mixture was placed in a tightly closed drier at 70° C. and then heat-treated therein for about one hour. The heat-treated mixture was granulated by extrusion through a screw front extru-sion type granulating device provided with a spherical die containing holes 0.6mm in size (die thickness 0.6 mm and gap between the extruding part and the die 1 mm) (produced by Fuji Paudal Co., Ltd. and marketed under trademark designation of "Dome Gran" ). The granules thus obtained were treated by means of a wet continuous size-uniformizing device (produced by Fuji Paudal Co., Ltd. and marketed under trademark designation of "Turbo Comminutor") and further heat-treated for about one hour in a drier kept at 200° C. to obtain granulated particles (14) of absorbent resin. The properties of the granulated particles (14) of absorbent resin are shown in Table 3.

EXAMPLE 19

Granulated particles (15) of absorbent resin were obtained by repeating the procedure of Example 18 while using diglycerin in the place of the glycerin. The properties of the granulated particles (15) of absorbent resin are shown in Table 3.

EXAMPLE 20

Granulated particles (16) of absorbent resin were obtained by repeating the procedure of Example 18 while changing the amount of the glycerin to 5 parts by weight. The properties of the granulated particles (16) of absorbent resin are shown in Table 3.

EXAMPLE 21

Granulated particles (17) of absorbent resin were obtained by repeating the procedure of Example 18 while switching the glycerin to polyglycerin. The properties of the granulated particles (17) of absorbent resin are shown in Table 3.

EXAMPLE 22

Granulated particles (18) of absorbent resin were obtained by repeating the procedure of Example 18 while changing the amount of the glycerin to 25 parts by weight. The properties of the granulated particles (18) of absorbent resin are shown in Table 3.

EXAMPLE 23

Granulated particles (19) of absorbent resin were obtained by repeating the procedure of Example 18 while changing the size of the holes in the die to 0.3 mm, the die thickness to 0.3 mm, and the gap between the extruding part and the die to 0.5 mm respectively in the screw front extrusion type granulating device provided with a spherical die. The properties of the granulated particles (19) of absorbent resin are shown in Table 3.

EXAMPLE 24

By means of a screw type mixer, 100 parts by weight of the absorbent resin (1) for reference obtained in Referential Example 1 and 10 parts by weight of diglycerin were mixed. The resultant mixture was granulated by extrusion through a screw front extru-sion type granulating device provided with a spherical die containing holes 0.6 mm in size (die thickness 0.6 mm and gap between the extruding part and the die 1 mm) (produced by Fuji Paudal Co., Ltd. and marketed under trademark designation of "TTurbocommuter" ). The produced granules were treated by means of a wet continuous size-uniformizing device (produced by Fuji Paudal Co., Ltd. and marketed under trademark designation of "Turbo Comminutor") and further heat-treated for about one hour in a drier dept at 200° C. to obtain granulated particles (20) of absorbent resin. The properties of the granulated particles (20) of absorbent resin are shown in Table 3.

EXAMPLE 25

By means of a screw type mixer, 100 parts by weight of the absorbent resin (1) for reference obtained in Referential Example 1 and 10 parts by weight of diglycerin were mixed. The resultant mixture was placed in a tightly closed drier at 70° C. and then heat-treated therein for about one hour. The heat-treated mixture was granulated by extrusion through a screw front extru-sion type granulating device provided with a spherical die containing holes 0.6 mm in size (die thickness 0.6 mm and gap between the extruding part and the die 1 mm) (produced by Fuji Paudal Co., Ltd. and marketed under trademark designation of "Dome Gran" ). The granules thus obtained were placed in a drier kept at 200° C. and heat-treated therein for about one hour to obtain granulated particles (21) of absorbent resin. The properties of the granulated particles (21) of absorbent resin are shown in Table 3.

EXAMPLE 26

Granulated particles (22) of absorbent resin were obtained by repeating the procedure of Example 18 while switching the extrusion granulating device to a screw lateral extrusion type granulating device provided with a screen (size of holes in the screen 0.6 mm, screen thickness 0.6 mm, and gap between the extruding part and the screen 0 mm) (produced by Fuji Paudal Co., Ltd. and marketed under trademark designation of "PelleterDouble"). The properties of the granulated particles (22) of absorbent resin are shown in Table 3.

EXAMPLE 27

Granulated particles (23) of absorbent resin were obtained by repeating the procedure of Example 18 while switching the extrusion granulating device to a blade oscillating type extrusion granulating device provided with a screen (size of holes in the screen 0.6 mm, screen thickness 0.6 mm, and gap between the extruding part and the screen 0 mm) (produced by Kikusui Seisakusho K.K. and marketed under product code of "OG-SR"). The properties of the granulated particles (23) of absorbent resin are shown in Table 3.

Referential Example 3

An absorbent resin (3) for reference was obtained by repeating the procedure of Referential Example 1 while having the hydrogel polymer pulverized with a hammer mill under milder conditions and then classifying the resultant powder with a 20-mesh metal net. It was tested for various properties. The results are shown in Table 3.

EXAMPLE 28

By means of a screw type mixer, 100 parts by weight of the absorbent resin (3) for reference obtained in Referential Example 3 and 10 parts by weight of glycerin were mixed. The resultant mixture was placed in a tightly sealed drier at 70° C. and heat-treated therein for about one hour. The heat-treated mixture was granulated by extrusion through a screw front extrusion type granulating device provided with a spherical die containing holes 1.2 mm in size (die thickness 1.2 mm and gap between the extruding part and the die 1 mm) (produced by Fuji Paudal Co., Ltd. and marketed under trademark designation of "Dome Gran"). The produced granules were treated by means of a wet continuous size-uniformizing device (produced by Fuji Paudal Co., Ltd. and marketed under trademark designation of "Turbo Comminutor") and further heat-treated for about one hour in a drier dept at 200° C. to obtain granulated particles (24) of absorbent resin. The properties of the granulated particles (24) of absorbent resin are shown in Table 3.

Control 9

Granulated particles (6) of absorbent resin for comparison were obtained by repeating the procedure of Example 18 while omitting the use of the glycerin. The properties of the granulated particles (6) of absorbent resin for comparison are shown in Table 3.

Control 10

Granulated particles (7) of absorbent resin for comparison were obtained by repeating the procedure of Example 18 while omitting the granulation by extrusion through the screw front extrusion type granulating device provided with a spherical die. The properties of the granulated particles (7) of absorbent resin for comparison are shown in Table 3.

Control 11

Granulated particles (8) of absorbent for comparison were obtained by mixing 100 parts by weight of the absorbent resin (1) for reference obtained in Referential Example 1 with 10 parts by weight of glycerin by means of a screw type mixer, packing the resultant mixture in a bowl immersed in an oil bath (200° C.), and heat-treating the mixture as stirred therein for about one hour. The properties of the granulated particles (8) of absorbent resin for comparison are shown in Table 3.

Control 12

Granulated particles (9) of absorbent resin for comparison were obtained by kneading 200 parts of the absorbent resin (3) for reference obtained in Referential Example 3, 800 parts of bentonite, and 300 parts of a water:ethanol (1:1) solution in ablender (produced by Fuji Paudal Co., Ltd. and marketed under trademark designation of "Spartan Ryuza RMO-2H"), then granulating the resultant blend by extrusion through an extrusion granulating device provided with a die containing holes 3 mm in size and having a thickness of 5 mm (produced by Fuji Paudal Co., Ltd. and marketed under trademark designation of "Disk Pelleter F-5"), and drying the produced granules by the use of a hot-air drier at 105° C. until the water content thereof decreased to below 5%. The properties of the granulated particles (9) of absorbent resin for comparison are shown in Table 3.

Control 13

When the procedure of Example 28 was repeated excepting the screw front extrusion type granulating device provided with a spherical die was switched to a conventional screw front extru-sion type granulating device provided with a die containing holes 1.2 mm in size (die thickness 5 mm and gap between the extruding part and the die 5 mm) (produced by Hiraga Kosakusho K.K. and marketed under trademark designation of "Chopper, Model No. 32E"), the mixture being granulated clogged the holes in the die and could not be extruded through the die.

EXAMPLE 29

The granulated particles of absorbent resin obtained in the working examples mentioned above and the absorbent resins for comparison obtained in the controls mentioned above were tested for physical integrity. The results are shown in Table 4.

EXAMPLE 30

By means of a screw type mixer, 100 parts by weight of the absorbent resin (1) for reference obtained in Referential Example 1 and 10 parts by weight of glycerin were mixed. The resultant mixture was placed in a tightly closed drier at 70° C. and then heat-treated therein for about one hour. The heat-treated mixture was granulated by extrusion through a screw front extru-sion type granulating device provided with a spherical die containing holes 0.6mmin size (die thickness 0.6 mm and gap between the extruding part and the die 1 mm) (produced by Fuji Paudal Co., Ltd. and marketed under trademark designation of "Dome Gran"). The granules thus obtained were placed in a drier kept at 200 C and heat-treated therein for about one hour to obtain ribbonlike granulated particles (26) of absorbent resin measuring about 100 mm in length and about 0.6 mm in size.

EXAMPLE 31

By means of a screw type mixer, 100 parts by weight of the absorbent resin (1) for reference obtained in Referential Example 1 and 10 parts by weight of glycerin were mixed. The resultant mixture was placed in a tightly closed drier at 70° C. and then heat-treated therein for about one hour. The heat-treated mixture was granulated by extrusion through a screw front extru-sion type granulating device provided with a spherical die containing holes 0.6 mm in size (die thickness 0.6 mm and gap between the extruding part and the die 1 mm) (produced by Fuji Powder K.K. and marketed under trademark designation of "Turbocommuter"). The granules thus obtained were irradiated with gamma ray at a dosage of 100 kGy by means of a gamma ray irradiating device to obtain a flexible reticular sheet of granulated particles (27) of absorbent resin.

EXAMPLE 32

By means of a screw type mixer, 100 parts by weight of the absorbent resin (2) for reference obtained in Referential Example 2, 5 parts by weight of glycerin, and 17 parts by weight of polyamide polyamine epichlorohydrin resin (aqueous 30% solution, molecular weight 20,000) were mixed. The resultant mixture was granulated by extrusion through a screw front extrusion type granulating device provided with a spherical die containing holes 0.6 mm in size (die thickness 0.6 mm and gap between the extruding part and the die 1 mm) (produced by Fuji Paudal Co., Ltd. and marketed under trademark designation of "Dome Gran") to obtain ribbonlike granulated particles (28) measuring about 80 mm in length and about 0.6 mm in size.

When the granulated particles (26) to (28) obtained respec-tively in Examples 30 to 32 were swelled with purified water, they were enlarged in similar shapes and allowed to retain shape even after having been swelled with absorbed water. They avoided regenerating fine powder.

TABLE 2

| | Particle size distribution (%) | | | | |
|---|---|---|---|---|---|
| | on 14 mesh | on 20 mesh | on 50 mesh | on 100 mesh | through 100 mesh |
| Granulated particles 1 of absorbent resin of Example 5 | 0 | 0 | 95 | 3 | 2 |
| Granulated particles 2 of absorbent resin of Example 6 | 0 | 0 | 95 | 3 | 2 |
| Granulated particles 3 of absorbent resin of Example 7 | 0 | 0 | 96 | 3 | 1 |
| Granulated particles 4 of absorbent resin of Example 8 | 0 | 0 | 79 | 18 | 3 |
| Granulated particles 5 of absorbent resin of Example 9 | 0 | 0 | 98 | 2 | 0 |
| Granulated particles 6 of absorbent resin of Example 10 | 0 | 0 | 85 | 15 | 0 |
| Granulated particles 7 of absorbent resin of Example 11 | 0 | 0 | 87 | 12 | 1 |
| Granulated particles 8 of absorbent resin of Example 12 | 0 | 0 | 94 | 5 | 1 |
| Granulated particles 9 of absorbent resin of Example 13 | 0 | 0 | 92 | 8 | 0 |
| Granulated particles 10 of absorbent resin of Example 14 | 0 | 0 | 91 | 9 | 0 |
| Granulated particles 11 of absorbent resin of Example 15 | 0 | 0 | 71 | 23 | 6 |
| Granulated particles 12 of absorbent resin of Example 16 | 0 | 0 | 56 | 37 | 7 |
| Granulated particles 13 of absorbent resin of Example 17 | 0 | 0 | 45 | 44 | 11 |
| Granulated particles 1 of absorbent resin for comparison of Control 4 | 0 | 0 | 10 | 31 | 59 |
| Granulated particles 2 of absorbent resin for comparison of Control 5 | 0 | 0 | 15 | 51 | 34 |
| Granulated particles 3 of absorbent resin for comparison of Control 6 | 89 | 7 | 4 | 0 | 0 |
| Granulated particles 4 of absorbent resin for comparison of Control 7 | 0 | 0 | 14 | 50 | 36 |

TABLE 3

| | Particle size distribution (%) | | | | | Fluid permeability (sec) | Speed of absorption (sec) | absorption capacity (g/g) |
|---|---|---|---|---|---|---|---|---|
| | on 14 mesh | on 20 mesh | on 50 mesh | on 100 mesh | through 100 mesh | | | |
| Absorbent resin 1 for reference of Referential Example 1 | 0 | 0 | 5 | 34 | 61 | 600 | 25 | 54 |
| Absorbent resin 2 for reference of Referential Example 2 | 0 | 0 | 8 | 32 | 60 | 600 | 23 | 50 |
| Absorbent resin 3 for reference of Referential Example 3 | 0 | 0 | 50 | 29 | 21 | 600 | 48 | 46 |
| Granulated particles 14 of absorbent resin of Example 18 | 0 | 0 | 97 | 2 | 1 | 15 | 10 | 49 |
| Granulated particles 15 of absorbent resin of Example 19 | 0 | 0 | 92 | 5 | 3 | 21 | 15 | 50 |
| Granulated particles 16 of absorbent resin of Example 20 | 0 | 0 | 85 | 8 | 7 | 24 | 16 | 52 |

TABLE 3-continued

| | Particle size distribution (%) | | | | | Fluid permeability (sec) | Speed of absorption (sec) | absorption capacity (g/g) |
|---|---|---|---|---|---|---|---|---|
| | on 14 mesh | on 20 mesh | on 50 mesh | on 100 mesh | through 100 mesh | | | |
| Granulated particles 17 of absorbent resin of Example 21 | 0 | 0 | 95 | 3 | 2 | 20 | 10 | 53 |
| Granulated particles 18 of absorbent resin of Example 22 | 0 | 0 | 99 | 1 | 0 | 13 | 9 | 43 |
| Granulated particles 19 of absorbent resin of Example 23 | 0 | 0 | 84 | 14 | 2 | 19 | 8 | 51 |
| Granulated particles 20 of absorbent resin of Example 24 | 0 | 0 | 87 | 6 | 7 | 25 | 12 | 49 |
| Granulated particles 21 of absorbent resin of Example 25 | 0 | 0 | 81 | 11 | 8 | 26 | 13 | 50 |
| Granulated particles 22 of absorbent resin of Example 26 | 0 | 0 | 77 | 12 | 11 | 36 | 18 | 50 |
| Granulated particles 23 of absorbent resin of Example 27 | 0 | 0 | 72 | 15 | 13 | 38 | 16 | 51 |
| Granulated particles 24 of absorbent resin of Example 28 | 0 | 78 | 13 | 9 | 0 | 16 | 35 | 43 |
| Granulated particles 6 of absorbent resin for comparison of Control 9 | 0 | 0 | 10 | 36 | 54 | 600 | 25 | 55 |
| Granulated particles 7 of absorbent resin for comparison of Control 10 | 0 | 0 | 24 | 44 | 32 | 240 | 80 | 51 |
| Granulated particles 8 of absorbent resin for comparison of Control 11 | 0 | 0 | 21 | 37 | 42 | 450 | 65 | 50 |
| Granulated particles 9 of absorbent resin for comparison of Control 12 | 86 | 7 | 5 | 2 | 0 | 60 | not measure | 18 |

TABLE 4

| | Particle size distribution (%) after vibration in paint shaker | | | | | |
|---|---|---|---|---|---|---|
| Example 29 | on 14 mesh | on 20 mesh | on 50 mesh | on 100 mesh | through 100 mesh | Physical integrity |
| Granulated particles 2 of absorbent resin | 0 | 0 | 81 | 14 | 5 | 95 |
| Granulated particles 3 of absorbent resin | 0 | 0 | 86 | 8 | 6 | 94 |
| Granulated particles 5 of absorbent resin | 0 | 0 | 92 | 7 | 1 | 99 |
| Granulated particles 8 of absorbent resin | 0 | 0 | 87 | 10 | 3 | 97 |
| Granulated particles 12 of absorbent resin | 0 | 0 | 39 | 42 | 19 | 81 |
| Granulated particles 14 of absorbent resin | 0 | 0 | 95 | 2 | 3 | 97 |
| Granulated particles 15 of absorbent resin | 0 | 0 | 89 | 6 | 5 | 95 |
| Granulated particles 24 of absorbent resin | 0 | 68 | 19 | 11 | 2 | 98 |
| Granulated particles 1 of absorbent resin for comparison | 0 | 0 | 5 | 35 | 60 | 40 |
| Granulated particles 3 of absorbent resin for comparison | 0 | 0 | 13 | 35 | 52 | 48 |
| Granulated particles 4 of absorbent resin for comparison | 0 | 0 | 16 | 34 | 50 | 50 |
| Granulated particles 7 of absorbent resin for comparison | 0 | 0 | 19 | 34 | 47 | 53 |
| Granulated particles 8 of absorbent resin for comparison | 0 | 0 | 18 | 31 | 51 | 49 |
| Granulated particles 9 of absorbent resin for comparison | 11 | 18 | 22 | 24 | 25 | 75 |

Industrial Applicability

The absorbent resin composition of this invention possesses a high speed of absorption, excels in fluid permeability, and manifests a high absorption capacity under load as described above. Adoption of such an absorbent resin composition as fulfills these properties at the high levels mentioned above for an absorbent article such as, for example, a hygienic material allows manufacture of a product enjoying high sensation of dryness due to an excellent ability to absorb or a product suffering leakage only sparingly. Further, the absorbent resin composition of this invention contains a fine powder in a very small amount and, therefore, enjoys perfect ease of handling and contributes immensely to improving the work environment.

Further, the method of this invention for granulation enables granulated particles of absorbent resin which permits arbitrary control of particle size and exhibits various excellent absorption properties including high physical integrity, easy handling, high fluid permeability, and high absorption to be manufactured economically advantageously. The granulated particles of absorbent resin thus obtained feature an ideal aspect ratio (major size/minor size), fairly high homogeneity in shape and size, perfect retention of shape even after being swelled with absorbed liquid, infallible prevention of fine powder regeneration, and high prominence in various absorption properties. Thus, they fit such hygienic materials as disposable diapers.

What is claimed is:

1. An absorbent resin composition comprising primary particles of absorbent resin and granulated particles obtained by granulating an absorbent resin having an average particle size smaller than that of said primary particles by using at least one granulating agent selected from the group consisting of water, a polyhydric alcohol, an amino group-containing compound, an amide group-containing compound, and a carboxyl group-containing compound.

2. An absorbent resin composition according to claim 1, wherein said primary particles of absorbent resin have an average particle size in the range of 150 to 800 μm and said granulated particles of absorbent resin are obtained by granulating particles of absorbent resin having an average particle size in the range of 10 to 100 μmm.

3. An absorbent resin composition according to claim 1, wherein said primary particles of absorbent resin have an average particle size 2.5 to 10 times that of particles of absorbent resin from which said granulated particles of absorbent resin are obtained by granulation.

4. An absorbent resin composition according to any of claims 1 to 3, wherein said granulated particles of absorbent resin have an average particle size in the range of 150 to 800 μm.

5. An absorbent resin composition according to any of claims 1 to 4, wherein said granulated particles of absorbent resin have an average particle size larger than that of said primary particles of absorbent resin.

6. An absorbent resin composition according to any of claims 1 to 5, wherein said granulated particles of absorbent resin have an average particle size 1.1 to 5 times that of said primary particles of absorbent resin.

7. An absorbent resin composition according to any of claims 1 to 6, wherein the amount of said granulated particles of absorbent resin is in the range of 5 to 100 parts by weight based on 100 parts by weight of said primary particles of absorbent resin.

8. An absorbent resin composition according to any of claims 1 to 7, wherein said granulated particles of absorbent resin have an apparent gel expansion ratio of at least 10%.

9. An absorbent resin composition according to any of claims 1 to 8, wherein said granulated particles of absorbent resin are obtained by granulating particles of absorbent resin with a polycationic compound and/or a polyhydric alcohol.

10. An absorbent resin composition according to claim 1, wherein said granulated particles of absorbent resin have an aspect ratio (major size/minor size) of not less than 1.5.

11. An absorbent resin composition according to claim 1, wherein said granulated particles of absorbent resin are obtained by mixing particles of absorbent resin with a granulating agent and extruding the resultant mixture through an extrusion granulating device provided with a spherical perforated plate.

12. An absorbent resin composition according to claim 2, wherein said primary particles of absorbent resin have an average particle size 2.5 to 10 times that of particles of absorbent resin from which said granulated particles of absorbent resin are obtained by granulation.

13. An absorbent resin composition according to claim 4, wherein said granulated particles of absorbent resin have an average particle size larger than that of said primary particles of absorbent resin.

14. An absorbent resin composition according to claim 4, wherein said granulated particles of absorbent resin have an average particle size 1.1 to 5 times that of said primary particles of absorbent resin.

15. An absorbent resin composition according to claim 5, wherein said granulated particles of absorbent resin have an average particle size 1.1 to 5 times that of said primary particles of absorbent resin.

16. An absorbent resin composition according to claim 4, wherein the amount of said granulated particles of absorbent resin is in the range of 5 to 100 parts by weight based on 100 parts by weight of said primary particles of absorbent resin.

17. An absorbent resin composition according to claim 5, wherein the amount of said granulated particles of absorbent resin is in the range of 5 to 100 parts by weight based on 100 parts by weight of said primary particles of absorbent resin.

18. An absorbent resin composition according to claim 4, wherein said granulated particles of absorbent resin have an apparent gel expansion ration of at least 10%.

19. An absorbent resin composition according to claim 5, wherein said granulated particles of absorbent resin have an apparent gel expansion ration of at least 10%.

20. An absorbent resin composition according to claim 4, wherein said granulated particles of absorbent resin are obtained by granulating particles of absorbent resin with a polycationic compound and/or a polyhydric alcohol.

21. An absorbent resin composition according to claim 5, wherein said granulated particles of absorbent resin are obtained by granulating particles of absorbent resin with a polycationic compound and/or a polyhydric alcohol.

22. An absorbent resin composition comprising primary particles of absorbent resin and granulated particles of absorbent resin, said granulated particles having been obtained by granulating particles of absorbent resin having an average particle size smaller than that of said primary particles, the amount of said granulated particles being in the range of 5 to 100 parts by weight based on 100 parts by weight of said primary particles of absorbent resin.

23. An absorbent resin composition according to claim 1, wherein said particles of absorbent resin to be used for the granulated particles of absorbent resin are obtained by classifying said primary particles of absorbent resin.

24. An absorbent resin composition according to claim 1, which is obtained by mixing said primary particles of absorbent resin and said granulated particles of absorbent resin.

* * * * *